US009922668B2

(12) United States Patent
Bradley et al.

(10) Patent No.: US 9,922,668 B2
(45) Date of Patent: Mar. 20, 2018

(54) ESTIMATING FRACTIONAL CHIRP RATE WITH MULTIPLE FREQUENCY REPRESENTATIONS

(71) Applicant: KnuEdge Incorporated, San Diego, CA (US)

(72) Inventors: David C. Bradley, San Diego, CA (US); Yao Huang Morin, San Diego, CA (US); Janis Intoy, San Diego, CA (US); Sean O'Connor, San Diego, CA (US); Nick Hilton, San Diego, CA (US); Massimo Mascaro, San Diego, CA (US)

(73) Assignee: KnuEdge Incorporated, San Diego, CA (US)

( * ) Notice: Subject to any disclaimer, the term of this patent is extended or adjusted under 35 U.S.C. 154(b) by 0 days.

(21) Appl. No.: 14/969,036

(22) Filed: Dec. 15, 2015

(65) Prior Publication Data

US 2016/0232924 A1 Aug. 11, 2016

Related U.S. Application Data

(60) Provisional application No. 62/112,796, filed on Feb. 6, 2015.

(51) Int. Cl.
*G10L 17/26* (2013.01)
*G10L 25/90* (2013.01)
(Continued)

(52) U.S. Cl.
CPC .............. *G10L 25/90* (2013.01); *G10L 25/03* (2013.01); *G10L 25/27* (2013.01); *G10L 15/02* (2013.01);
(Continued)

(58) Field of Classification Search
None
See application file for complete search history.

(56) References Cited

U.S. PATENT DOCUMENTS 3,617,636 A 11/1971 Ogihara
3,649,765 A 3/1972 Rabiner et al.
(Continued)

FOREIGN PATENT DOCUMENTS

EP 1744305 1/2007
WO 2012/129255 9/2012
(Continued)

OTHER PUBLICATIONS

Xia et al.; Discrete Chirp-Fourier Transform and Its Application to Chirp Rate Estimation; IEEE Transactions on signal processing, vol. 48, No. 11, Nov. 2000; pp. 3122-3133.*

(Continued)

*Primary Examiner* — Abul Azad
(74) *Attorney, Agent, or Firm* — Fish & Richardson P.C.

(57) ABSTRACT

An estimate of a fractional chirp rate of a signal may be computed by using multiple frequency representations of the signal. A first frequency representation may be computed using a first fractional chirp rate and a first score may be computed using the first frequency representation that indicates a match between the first fractional chirp rate and a fractional chirp rate of the signal. A second frequency representation may be computed using a second fractional chirp rate and a second score may be computed using the second frequency representation that indicates a match between the second fractional chirp rate and the fractional chirp rate of the signal. The fractional chirp rate of the signal may be estimated using the first score and the second score, for example, by selecting a fractional chirp rate corresponding to a highest score.

14 Claims, 17 Drawing Sheets

(51) Int. Cl.
*G10L 25/03* (2013.01)
*G10L 25/27* (2013.01)
*G10L 17/02* (2013.01)
*G10L 25/18* (2013.01)
*G10L 25/06* (2013.01)
*G10L 25/51* (2013.01)
*G10L 15/02* (2006.01)
*G10L 21/0208* (2013.01)

(52) U.S. Cl.
CPC .......... *G10L 17/02* (2013.01); *G10L 21/0208* (2013.01); *G10L 25/06* (2013.01); *G10L 25/18* (2013.01); *G10L 25/51* (2013.01)

(56) References Cited

U.S. PATENT DOCUMENTS

| | | | |
|---|---|---|---|
| 4,454,609 A | 6/1984 | Kates | |
| 4,797,923 A | 1/1989 | Clarke | |
| 5,054,072 A | 10/1991 | McAulay et al. | |
| 5,195,166 A | 3/1993 | Hardwick et al. | |
| 5,216,747 A | 6/1993 | Hardwick et al. | |
| 5,226,108 A | 7/1993 | Hardwick et al. | |
| 5,261,007 A | 11/1993 | Hirsch | |
| 5,321,636 A | 6/1994 | Beerends | |
| 5,548,680 A | 8/1996 | Cellario | |
| 5,684,920 A | 11/1997 | Iwakami et al. | |
| 5,812,967 A | 9/1998 | Ponceleon et al. | |
| 5,815,580 A | 9/1998 | Craven et al. | |
| 5,953,696 A | 9/1999 | Nishiguchi | |
| 6,356,868 B1 | 3/2002 | Yuschik et al. | |
| 6,477,472 B2 | 11/2002 | Qian et al. | |
| 6,496,797 B1 | 12/2002 | Redkov | |
| 6,526,376 B1 | 2/2003 | Villette et al. | |
| 6,721,699 B2 | 4/2004 | Xu | |
| 6,963,833 B1 | 11/2005 | Singhal | |
| 7,003,120 B1 | 2/2006 | Smith et al. | |
| 7,016,352 B1 | 3/2006 | Chow et al. | |
| 7,117,149 B1 | 10/2006 | Zakarauskas | |
| 7,249,015 B2 | 7/2007 | Jiang et al. | |
| 7,286,980 B2 | 10/2007 | Wang | |
| 7,315,812 B2 | 1/2008 | Berrends | |
| 7,389,230 B1 | 6/2008 | Nelken | |
| 7,596,489 B2 | 9/2009 | Kovesi et al. | |
| 7,660,718 B2 | 2/2010 | Padhi et al. | |
| 7,664,640 B2 | 2/2010 | Webber | |
| 7,668,711 B2 | 2/2010 | Chong et al. | |
| 7,672,836 B2 | 3/2010 | Lee et al. | |
| 7,774,202 B2 | 8/2010 | Spengler et al. | |
| 7,991,167 B2 | 8/2011 | Oxford | |
| 8,189,576 B2 | 5/2012 | Ferguson | |
| 8,212,136 B2 | 7/2012 | Shirai et al. | |
| 8,219,390 B1 | 7/2012 | Laroche | |
| 8,332,059 B2 | 12/2012 | Herre et al. | |
| 8,447,596 B2 | 5/2013 | Avendano et al. | |
| 8,548,803 B2 | 10/2013 | Bradley et al. | |
| 8,620,646 B2 | 12/2013 | Bradley et al. | |
| 8,666,092 B2 | 3/2014 | Zavarehei | |
| 8,731,923 B2 | 5/2014 | Shu | |
| 8,767,978 B2 | 7/2014 | Bradley et al. | |
| 2002/0152078 A1 | 10/2002 | Yuschik et al. | |
| 2002/0177994 A1 | 11/2002 | Chang | |
| 2003/0014245 A1 | 1/2003 | Brandman | |
| 2003/0055646 A1 | 3/2003 | Yoshioka et al. | |
| 2004/0034526 A1 | 2/2004 | Ma | |
| 2004/0128130 A1 | 7/2004 | Rose et al. | |
| 2004/0133424 A1 | 7/2004 | Ealey | |
| 2004/0167775 A1 | 8/2004 | Sorin | |
| 2004/0176949 A1 | 9/2004 | Wenndt et al. | |
| 2004/0193407 A1 | 9/2004 | Ramabadran | |
| 2004/0220475 A1 | 11/2004 | Szabo et al. | |
| 2005/0091045 A1 | 4/2005 | Oh | |
| 2005/0114128 A1 | 5/2005 | Hetherington et al. | |
| 2005/0149321 A1 | 7/2005 | Kabi et al. | |
| 2006/0080088 A1 | 4/2006 | Lee | |
| 2006/0100866 A1 | 5/2006 | Alewine et al. | |
| 2006/0122834 A1 | 6/2006 | Bennett | |
| 2006/0149558 A1 | 7/2006 | Kahn et al. | |
| 2006/0262943 A1 | 11/2006 | Oxford | |
| 2007/0010997 A1 | 1/2007 | Kim | |
| 2007/0299658 A1 | 12/2007 | Wang et al. | |
| 2008/0082323 A1 | 4/2008 | Bai et al. | |
| 2008/0183473 A1 | 7/2008 | Nagano et al. | |
| 2008/0270440 A1 | 10/2008 | He et al. | |
| 2009/0012638 A1 | 1/2009 | Lou | |
| 2009/0030690 A1 | 1/2009 | Yamada | |
| 2009/0076822 A1 | 3/2009 | Saniaume | |
| 2009/0091441 A1 | 4/2009 | Schweitzer, III et al. | |
| 2009/0228272 A1 | 9/2009 | Herbig | |
| 2010/0042407 A1 | 2/2010 | Crockett | |
| 2010/0215191 A1 | 8/2010 | Yoshizawa | |
| 2010/0251519 A1 | 8/2010 | Shinichi | |
| 2010/0260353 A1 | 10/2010 | Ozawa | |
| 2010/0262420 A1 | 10/2010 | Herre et al. | |
| 2010/0332222 A1 | 12/2010 | Bai et al. | |
| 2011/0016077 A1 | 1/2011 | Vasilache et al. | |
| 2011/0286618 A1 | 1/2011 | Vandali et al. | |
| 2011/0060564 A1 | 3/2011 | Hoge | |
| 2012/0243694 A1 | 9/2012 | Bradley et al. | |
| 2012/0243705 A1 | 9/2012 | Bradley et al. | |
| 2012/0243707 A1* | 9/2012 | Bradley | G10L 19/00 381/98 |
| 2012/0265534 A1 | 10/2012 | Bradley et al. | |
| 2013/0041489 A1 | 2/2013 | Bradley et al. | |
| 2013/0041565 A1 | 2/2013 | Bradley et al. | |
| 2013/0041656 A1 | 2/2013 | Bradley et al. | |
| 2013/0041657 A1 | 2/2013 | Bradley | |
| 2013/0041658 A1* | 2/2013 | Bradley | H04R 29/00 704/208 |
| 2014/0037095 A1 | 2/2014 | Bradley et al. | |
| 2014/0086420 A1 | 3/2014 | Bradley et al. | |

FOREIGN PATENT DOCUMENTS

| | | |
|---|---|---|
| WO | 2012/134991 | 10/2012 |
| WO | 2012/134993 | 10/2012 |
| WO | 2013022914 | 2/2013 |
| WO | 2013022918 | 2/2013 |
| WO | 2013022923 | 2/2013 |
| WO | 2013022930 | 2/2013 |
| WO | 2014130571 | 8/2014 |

OTHER PUBLICATIONS

International Search Report and Written Opinion for International Application No. PCT/US2016/016261, dated May 10, 2016.

Juan G. Vargas-Rubio et al., An Improved Spectrogram Using the Multiangle Centered Discrete Fractional Fourier Transform, 2005 IEEE International Conference on Acoustics, Speech and Signal Processing Mar. 18-23, 2005, Philadelphia PA, IEEE, Piscataway, NJ, vol. 4, Mar. 18, 2005, pp. 505-508, XP010792593, ISBN: 978-0-7803-8874-1 whole document.

Kepesi M. et al., Adaptive chirp-based-time frequency analysis of speech signals, Speech Communication, Esevier Science Publishers, Astermdam, NL, vol. 48, No. 5, May 1, 2006, pp. 474-492.

Serra, "Musical Sound Modeling with Sinusoids plus Noise", 1997, pp. 1-25.

Zahorian et al., A Spectral-Temporal Method for Pitch Tracking, Sep. 17, 2006, XP055191851.

Julius O. Smith, III, Spectral Audio Signal Processing, Jan. 1, 2011, XP055267579, ISBN: 978-0-9745607-3-1.

Kumar et al., "Speaker Recognition Using GMM", International Journal of Engineering Science and Technology, vol. 2, No. 6, 2010, pp. 2428-2436.

Kamath et al., "Independent Component Analysis for Audio Classification", IEEE 11th Digital Signal Processing Workshop & IEEE Signal Processing Education Workshop, 2004, pp. 352-355.

Yin et al., "Pitch- and Formant-Based Order Adaptation of the Fractional Fourier Transform and Its Application to Speech Recognition", EURASIP Journal of Audio, Speech, and Music

(56) References Cited

OTHER PUBLICATIONS

Processing, vol. 2009, Article ID 304579, [online], Dec. 2009, Retrieved on Sep. 26, 2012 from http://downloads.hindawi.com/journals/asmp/2009/304579.pdf, 14 pages.
Weruaga, Luis, et al., "Speech Analysis with the Fast Chirp Transform", Eusipco, www.eurasip.org/Proceedings/Eusipco/Eusipco2004/.../cr1374.pdf, 2004, 4 pages.
Ioana, Cornel, et al., "The Adaptive Time-Frequency Distribution Using the Fractional Fourier Transform", 18° Colloque sur le traitement du signal et des images, 2001, pp. 52-55.
Abatzoglou, Theagenis J., "Fast Maximum Likelihood Joint Estimation of Frequency and Frequency Rate", IEEE Transactions on Aerospace and Electronic Systems, vol. AES-22, Issue 5, Nov. 1986, pp. 708-715.
Rabiner, Lawrence R., "On the Use of Autocorrelation Analysis for Pitch Detection", IEEE Transactions on Acoustics, Speech, and Signal Processing, vol. ASSP-25, No. 1, Feb. 1977, pp. 24-33.
Lanat, Meir, et al., "A Spectral Autocorrelation Method for Measurement of the Fundamental Frequency of Noise-Corrupted Speech", IEEE Transactions on Acoustics, Speech, and Signal Processing, vol. ASSP-35, No. 6, Jun. 1987, pp. 741-750.
Robel, A., et al., "Efficient Spectral Envelope Estimation and Its Application to Pitch Shifting and Envelope Preservation", Proc. of the 8th Int. Conference on Digital Audio Effects (DAFx'05), Madrid, Spain, Sep. 20-22, 2005, 6 pages.
Hu, Guoning, et al., "Monaural Speech Segregation Based on Pitch Tracking and Amplitude Modulation", IEEE Transactions on Neural Networks, vol. 15, No. 5, Sep. 2004, 16.
Roa, Sergio, et al., "Fundamental Frequency Estimation Based on Pitch-Scaled Harmonic Filtering", 2007, 4 pages.
Cycling 74, "MSP Tutorial 26: Frequency Domain Signal Processing with pfft-" Jul. 6, 2008 (Captured via Internet Archive), http://www.cycling74.com.
Extended European Search Report dated Mar. 12, 2015, as received in European Patent Application No. 12 822 18.9.
International Search Report and Written Opinion dated Oct. 19, 2012, as received in International Application PCT/US2012/049909.
Mowlaee et al., "Chirplet Representation for Audio Signals Based on Model Order Selection Criteria," Computer Syatems and Applications, AICCSA 2009, IEEE/ACS International Conference on IEEE, Piscataway, NJ pp. 927-934 (May 10, 2009).
Weruaga et al., "The Fan-Chirp Transform for Non-Stationary Harmonic Signals," Signal Processing, Elsevier Science Publishers B.V. Amsterdam, NL, 87(6): 1505-1506 and 1512 (Feb. 24, 2007).
Adami et al., "Modeling Prosodic Dynamics for Speaker Recognition," Proceedings of IEEE International Conference in Acoustics, Speech and Signal Processing, Hong Kong (2003).
Cooke et al., "Robust Automatic Speech Recognition with Missing and Unreliable Acoustic Data," Speech communication, 34(3):267-285 (Jun. 2001).
Doval et al., "Fundamental Frequency Estimation and Tracking Using Maximum Likelihood Harmonic Matching and HMMs," IEEE International Conference on Acoustics, Speech, and Signal Processing, Proceedings, New York, NY, 1:221-224 (Apr. 27, 1993).
Extended European Search Report dated Feb. 12, 2015, as received in European Patent Application No. 12 821 868.2.
Extended European Search Report dated Oct. 9, 2014, as received in European Patent Application No. 12 763 782.5.
Goto, "A Robust Predominant-F0 Estimation Method for Real-Time Detection of Melody and Bass Lines in CD Recordings," Acoustics, Speech, and Signal Processing, Piscataway, NJ, 2(5):757-760 (Jun. 5, 2000).
International Search Report and Written Opinion dated Jun. 7, 2012, as received in International Application No. PCT/US2012/030274.
International Search Report and Written Opinion dated Oct. 23, 2012, as received in International Application No. PCT/US2012/049901.

* cited by examiner

100# ESTIMATING FRACTIONAL CHIRP RATE WITH MULTIPLE FREQUENCY REPRESENTATIONS

PRIORITY CLAIM

This application claims priority to U.S. Provisional Patent Application No. 62/112,796, entitled "PITCH VELOCITY ESTIMATION," filed Feb. 6, 2015, the entirety of which is incorporated herein by reference.

BACKGROUND

A harmonic signal may have a fundamental frequency and one or more overtones. Harmonic signals include, for example, speech and music. A harmonic signal may have a fundamental frequency, which may be referred to as the first harmonic. A harmonic signal may include other harmonics that may occur at multiples of the first harmonic. For example, if the fundamental frequency is f at a certain time, then the other harmonics may have frequencies of 2 f, 3 f, and so forth.

The fundamental frequency of a harmonic signal may change over time. For example, when a person is speaking, the fundamental frequency of the speech may increase at the end of a question. A change in the frequency of a signal may be referred to as a chirp rate. The chirp rate of a harmonic signal may be different for different harmonics. For example, if the first harmonic has a chirp rate of c, then other the harmonics may have chirp rates of 2 c, 3 c, and so forth.

In applications, such as speech recognition, signal reconstruction, and speaker recognition, it may be desirable to determine properties of a harmonic signal over time. For example, it may be desirable to determine a pitch of the signal, a rate of change of the pitch over time, or the frequency, chirp rate, or amplitude of different harmonics.

BRIEF DESCRIPTION OF THE FIGURES

The invention and the following detailed description of certain embodiments thereof may be understood by reference to the following figures.

DETAILED DESCRIPTION

Described herein are techniques for determining properties of a harmonic signal over time. For example, the properties of a harmonic signal may be determined at regular intervals, such as every 10 milliseconds. These properties may be used for processing speech or other signals, for example, as features for performing automatic speech recognition or speaker verification or identification. These properties may also be used to perform a signal reconstruction to reduce the noise level of the harmonic signal.

The relationship between the harmonics of a harmonic signal may be used to improve the estimation of the properties of the harmonic signal. For example, if the first harmonic of a harmonic signal has a frequency of f and a chirp rate of c, then it is expected that the higher harmonics have frequencies at multiples of f and chirp rates at multiples of c. Techniques that take advantage of these relationships may provide better results than other techniques.

A harmonic signal may have a pitch. For some harmonic signals, the pitch may correspond to the frequency of the first harmonic. For some harmonic signals, the first harmonic may not be present or not visible (e.g., may be covered by noise), and the pitch may be determined from a frequency difference between the second and third harmonics. For some harmonic signals, multiple harmonics may be present or not visible, and the pitch may be determined from the frequencies of the visible harmonics.

The pitch of a harmonic signal may change over time. For example, the pitch of a voice or the note of a musical instrument may change over time. As the pitch of a harmonic signal changes, each of the harmonics will have a chirp rate, and the chirp rate of each harmonic may be different. The rate of change of the pitch may be referred to as pitch velocity or described by a fractional chirp rate. In some implementations, the fractional chirp rate may by computed as $\chi = c_n/f_n$ where $\chi$ represents the fractional chirp rate, $c_n$ represents the chirp rate of the nth harmonic, and $f_n$ represents the frequency of the nth harmonic.

In some implementations, it may be desired to compute the pitch and/or fractional chirp rate of a harmonic signal at regular intervals. For example, it may be desired to compute the pitch and/or fractional chirp rate every 10 milliseconds by performing computations on a portion of the signal that may be obtained by applying a window (e.g., a Gaussian, Hamming, or Hann window) to the signal. Successive portions of the signal may be referred to as frames, and frames may overlap. For example, frames may be created every 10 milliseconds and each frame may be 50 milliseconds long.

Figure 1:
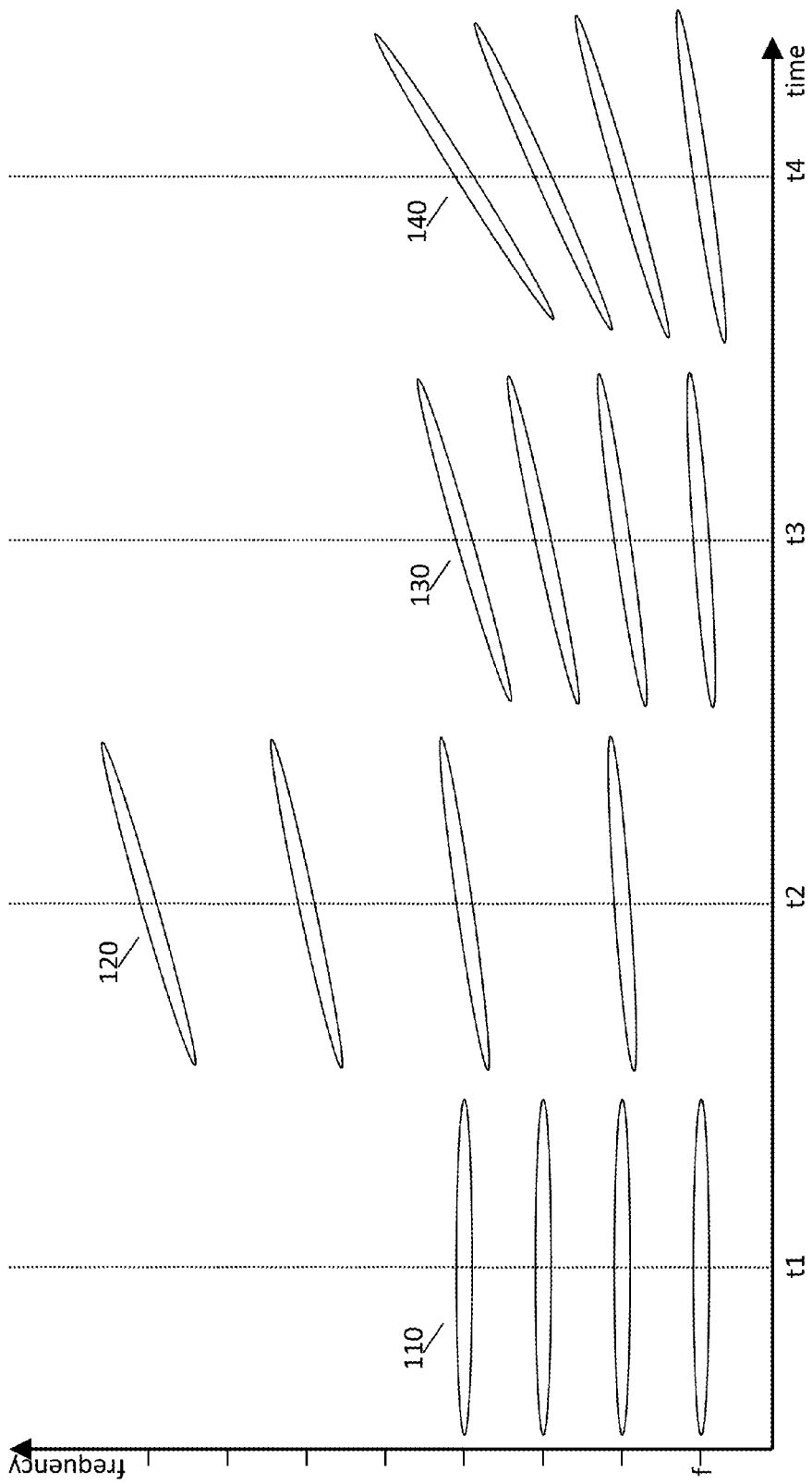
FIG. 1 illustrates examples of harmonic signals with different fractional chirp rates.

FIG. 1 illustrates examples of four harmonic signals with different fractional chirp rates as a function of time and frequency. FIG. 1 does not represent actual signals but provides a conceptual illustration of how chirplets (Gaussian signals with a specified time, frequency, chirp rate, and duration) would appear in a time-frequency representation, such as a spectrogram.

Harmonic signal 110 is centered at a time t1 and has four harmonics. The first harmonic has a frequency of f and the second, third, and fourth harmonics have frequencies of 2 f, 3 f and 4 f respectively. Each of the harmonics has a chirp rate of 0 since the frequency of the harmonics is not changing over time. Accordingly, the fractional chirp rate of harmonic signal 110 is 0.

Harmonic signal 120 is centered at time t2 and has four harmonics. The first harmonic has a frequency of 2 f and the second, third, and fourth harmonics have frequencies of 4 f, 6 f and 8 f respectively. The first harmonic has a chirp rate of c that is positive since the frequency is increasing over time. The second, third, and fourth harmonics have chirp rates of 2 c, 3 c, and 4 c, respectively. Accordingly, the fractional chirp rate of harmonic signal 120 is c/2 f.

Harmonic signal 130 is centered at time t3 and has four harmonics. The first harmonic has a frequency of f and the second, third, and fourth harmonics have frequencies of 2 f, 3 f and 4 f respectively. The first harmonic also has a chirp rate of c, and the second, third, and fourth harmonics have chirp rates of 2 c, 3 c, and 4 c, respectively. Accordingly, the fractional chirp rate of harmonic signal 130 is c/f, which is twice that of harmonic signal 120.

Harmonic signal 140 is centered at time t4 and has four harmonics. The first harmonic has a frequency off and the second, third, and fourth harmonics have frequencies of 2 f, 3 f and 4 f respectively. The first harmonic has a chirp rate of 2 c as the rate of change of frequency is double that of harmonic signal 130. The second, third, and fourth harmonics have chirp rates of 4 c, 6 c, and 8 c, respectively. Accordingly, the fractional chirp rate of harmonic signal 140 is 2 c/f, which is twice that of harmonic signal 130.

Figure 2:
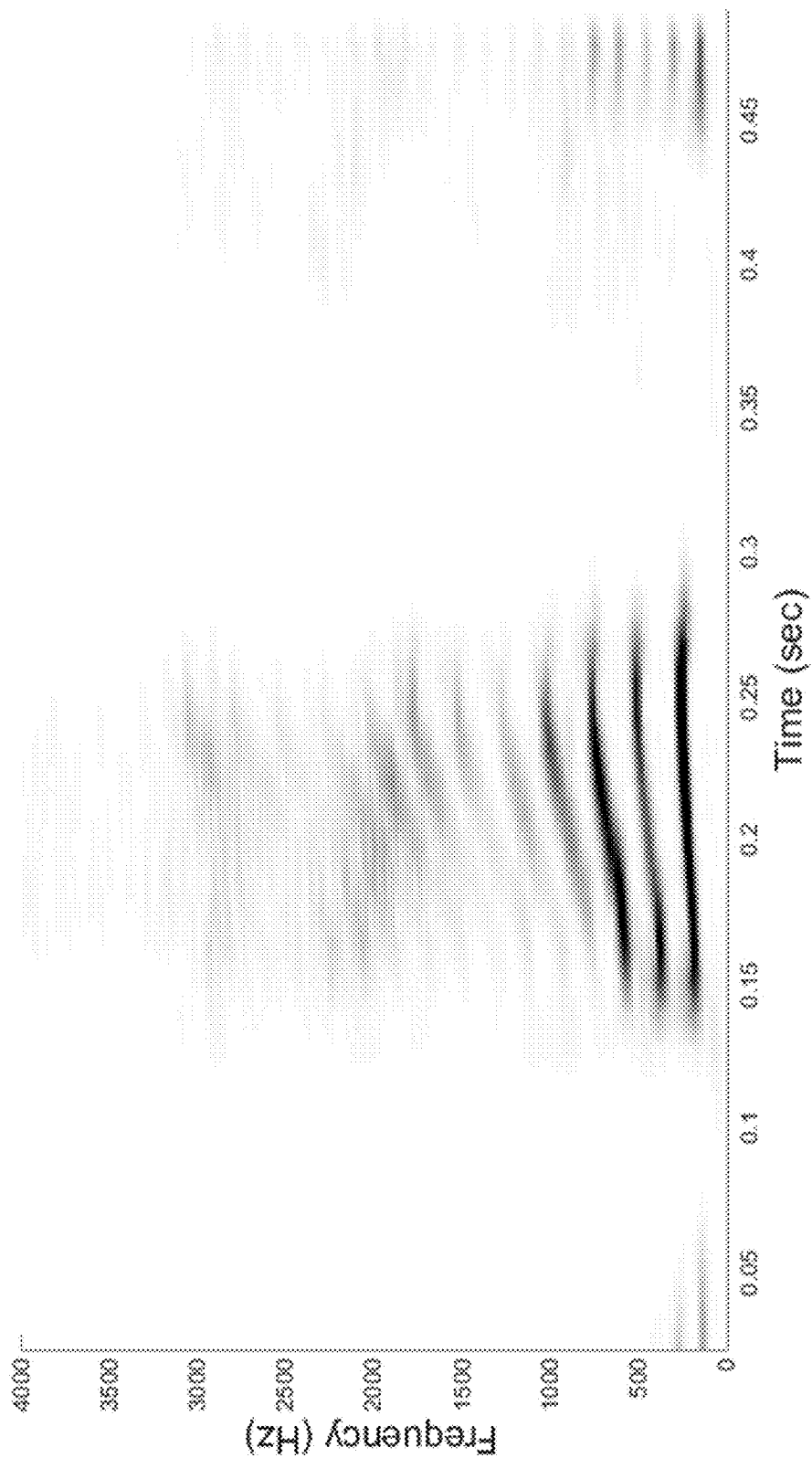
FIG. 2 illustrates a spectrogram of a portion of a speech signal.

FIG. 2 illustrates a spectrogram of a portion of a speech signal. In the spectrogram, multiple harmonics are visible. At each time instant in the spectrogram, the harmonics have the relationship described above. For example, at each time instant, the frequency and chirp rate of the second harmonic is about twice the frequency and chirp rate of the first harmonic.

Figure 3:
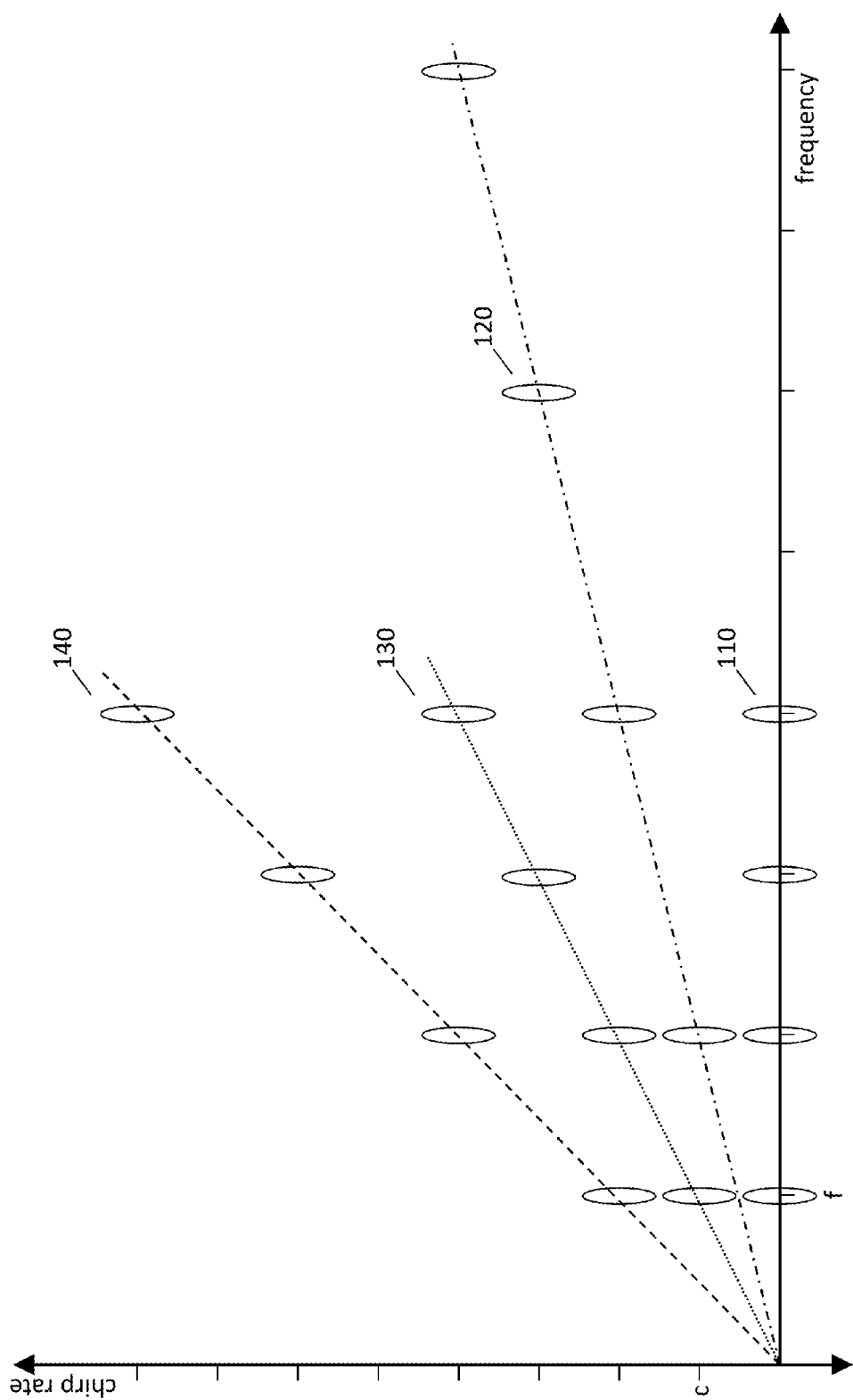
FIG. 3 illustrates a representation of a harmonic signal over frequency and chirp rate.

FIG. 3 illustrates examples of four harmonic signals as a function of frequency and chirp rate, which will be referred to herein as a frequency-chirp distribution or representation. FIG. 3 does not represent actual signals but provides a conceptual illustration of how the harmonic signals of FIG. 1 would appear in a representation of frequency and chirp rate. In computing a frequency-chirp representation, there may not be a time variable so the frequency-chirp distribution may represent an entire signal and not a portion of the signal at a particular time. In some implementations, it may be desired to compute a frequency-chirp distribution for portions of a signal corresponding to different times. For example, it may be desired to compute a frequency-chirp distribution every 10 milliseconds, by applying a sliding window to the signal.

FIG. 3 may be constructed conceptually by reviewing the frequency and chirp rate of the harmonics of the harmonic signals of FIG. 1. For example, for harmonic signal 110, each of the chirp rates is 0, and the frequencies of the four harmonics are 2 f, 3 f, and 4 f, respectively. Accordingly, the four harmonics of harmonic signal 110 are represented in these locations in FIG. 3. Similarly, the harmonics of harmonic signals 120, 130, and 140 are represented in FIG. 3 according to their respective frequencies and chirp rates from FIG. 1.

A frequency-chirp distribution may be computed using techniques similar to computing a time-frequency distribution, such as a spectrogram. For example, in some implementations, a frequency-chirp distribution may be computed using an inner product. Let FC(f, c) represent a frequency-chirp distribution where f corresponds to a frequency variable and c corresponds to a chirp rate variable. A frequency-chirp rate distribution may be computed using inner products as $$FC(f,c) = \langle x, \psi(f,c) \rangle$$

where x is the signal being processed (or a windowed portion of it) and $\psi(f, c)$ is a function parameterized by frequency f and chirp rate c. In some implementations, $\psi(f, c)$ may represent a chirplet, such as $$\psi(f, c) = \frac{1}{\sqrt{2\pi\sigma^2}} e^{-\frac{1}{2}\left(\frac{t-t_0}{\sigma}\right)^2 + f(t-t_0)i + \frac{c}{2}(t-t_0)^2 i}$$

where $\sigma$ corresponds to a duration or spread of the chirplet and $t_0$ is a location of the chirplet in time. To compute a distribution of frequency and chirp rate, one can select an appropriate function $\psi(f, c)$, such as a chirplet, and compute FC(f, c) for multiple values of f and c. A frequency-chirp distribution is not limited to the above example, and may be computed in other ways. For example, a frequency-chirp distribution may be computed as the real part, imaginary part, magnitude, or magnitude squared of an inner product, may be computed using measures of similarity other than an inner product, or may be computed using non-linear functions of the signal.

The four harmonic signals in FIG. 3 each have different fractional chirp rates. Harmonic signal 110 has a fractional chirp rate of 0, harmonic signal 120 has a fractional chirp rate of c/2 f, harmonic signal 130 has a fractional chirp rate of c/f, and harmonic signal 120 has a fractional chirp rate of 2 c/f. The dashed and dotted lines in FIG. 3 thus indicate lines of constant fractional chirp rate. A harmonic centered on the dash-dotted line will have a fractional chirp rate of c/2 f, a harmonic centered on the dotted line will have a fractional chirp rate of c/f, and a harmonic centered on the dashed line will have a fractional chirp rate of 2 c/f.

Figure 4:
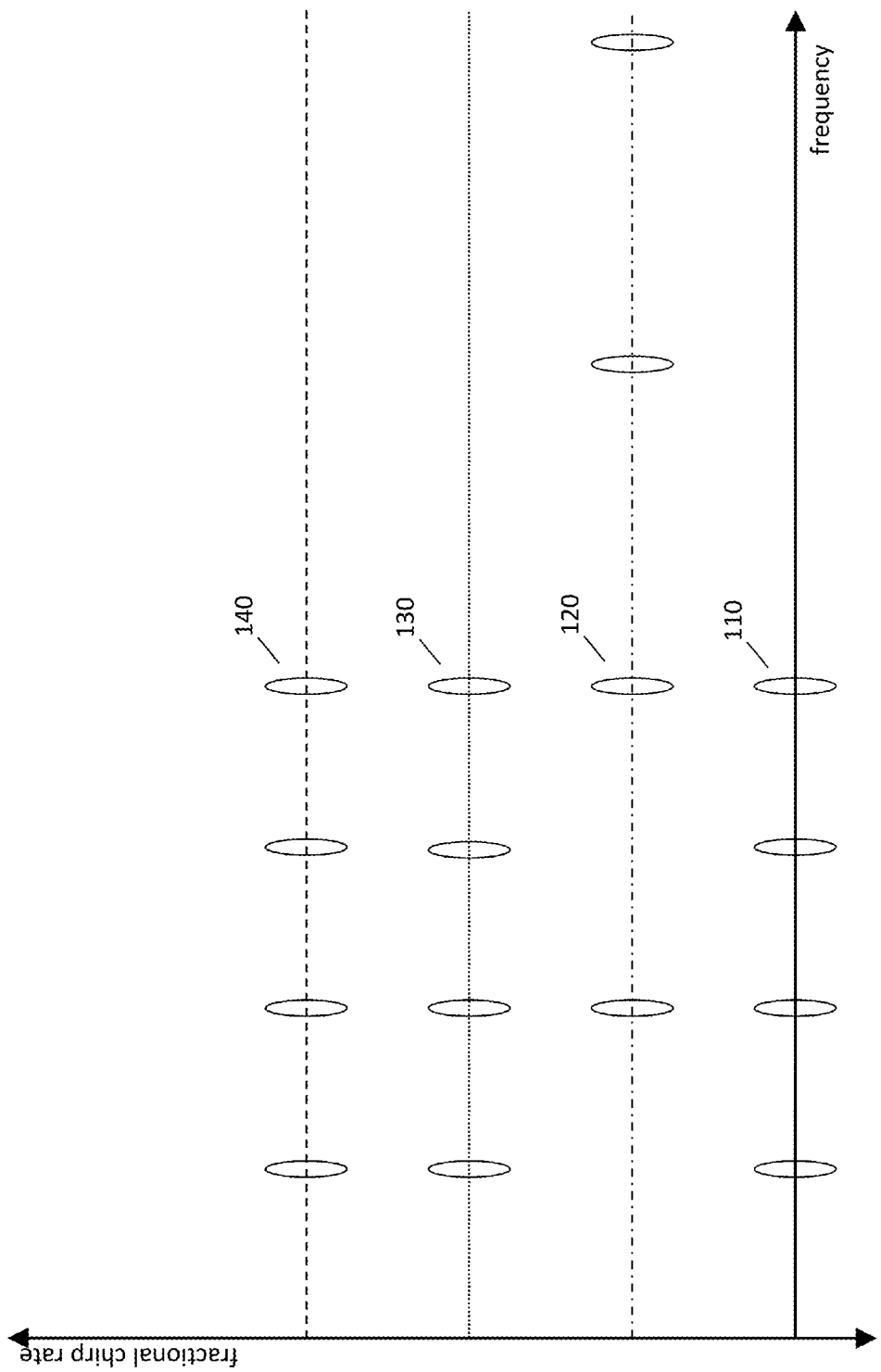
FIG. 4 illustrates a representation of a harmonic signal over frequency and fractional chirp rate.

Accordingly, any radial line in FIG. 3 corresponds to a constant fractional chirp rate. From this observation one can generate a distribution of frequency and fractional chirp rate, which may be referred to as a pitch-velocity transform (PVT) or a chirprum. A PVT may be denoted as P(f, $\chi$), where f corresponds to a frequency variable and $\chi$ corresponds to a fractional chirp rate variable. Conceptually, one may construct a PVT by warping a frequency-chirp distribution so that the radial lines of a frequency-chirp distribution become horizontal lines of a PVT. FIG. 4 shows a conceptual example of a PVT created from the frequency-chirp distribution of FIG. 3. Because each harmonic of a harmonic signal has the same fractional chirp rate, they are aligned horizontally as shown in FIG. 4.

In some implementations, a PVT may be computed from a frequency-chirp distribution. For example, a PVT may be computed as $$P(f,\chi) = FC(f,\chi f)$$

since $c = \chi f$ as described above. The PVT need not, however, be computed from a frequency-chirp distribution.

A PVT may also be computed using techniques similar to computing a time-frequency distribution, such as a spectrogram. For example, in some implementations a PVT may be computed using an inner product. A frequency-chirp rate distribution may be computed as $$P(f,\chi) = \langle x, \psi(f,\chi,f) \rangle$$

where $\psi(\ )$ is a function as described above. To compute a PVT, one can select an appropriate function $\psi(\ )$, such as a chirplet, and compute $P(f, \chi)$ for multiple values of f and $\chi$. A PVT is not limited to the above example, and a PVT may be computed in other ways. For example, a PVT may be computed as the real part, imaginary part, magnitude, or magnitude squared of an inner product, may be computed using measures of similarity other than an inner product, or may be computed using non-linear functions of the signal.

The PVT for a specified value of a fractional chirp rate is a function of frequency and may be considered to be a spectrum or a generalized spectrum of the signal. Accordingly, for each value of a fractional chirp rate, a generalized spectrum may be determined from the PVT that is associated with a particular fractional chirp rate. The generalized spectra may be referred to as $X_\chi(f)$. As described below, these generalized spectra need not be computed from a PVT and may be computed in other ways. The PVT for a specified fractional chirp rate corresponds to a slice of the PVT, which will be referred to herein as a row of the PVT (if the PVT was presented in a different orientation, this could also be referred to as a column and the orientation of the PVT is not a limiting feature of the techniques described herein). For clarity of explanation, a chirplet will be used for the function $\psi(\ )$ in the following discussion, but any appropriate function may be used for $\psi(\ )$.

For a fractional chirp rate of 0, the PVT corresponds to $$P(f,0) = \langle x, \psi(f,0) \rangle$$

which corresponds to an inner product of the signal with a Gaussian where the Gaussian has a chirp rate of zero and is modulated to the corresponding frequency f of the PVT. This may be the same as computing a short-time Fourier transform of the signal with a Gaussian window.

For a non-zero fractional chirp rate, the PVT corresponds to an inner product of the signal with a Gaussian where the chirp rate of the Gaussian increases as the frequency of the Gaussian increases. In particular, the chirp rate may be the product of the fractional chirp rate and the frequency. For non-zero chirp rates, the PVT may have an effect similar to slowing down or reducing the fractional chirp rate of the signal (or conversely, speeding up or increasing the fractional chirp rate of the signal). Accordingly, each row of the PVT corresponds to a generalized spectrum where the fractional chirp rate of the signal has been modified by a value corresponding to the row of the PVT.

When the fractional chirp rate of the generalized spectrum (or row of the PVT) is equal to the fractional chirp rate of the signal, the generalized spectrum may correspond to removing the fractional chirp rate of the signal and the generalized spectrum for this value of the fractional chirp rate may be referred to as a stationary spectrum of the signal or a best row of the PVT.

Figure 5:
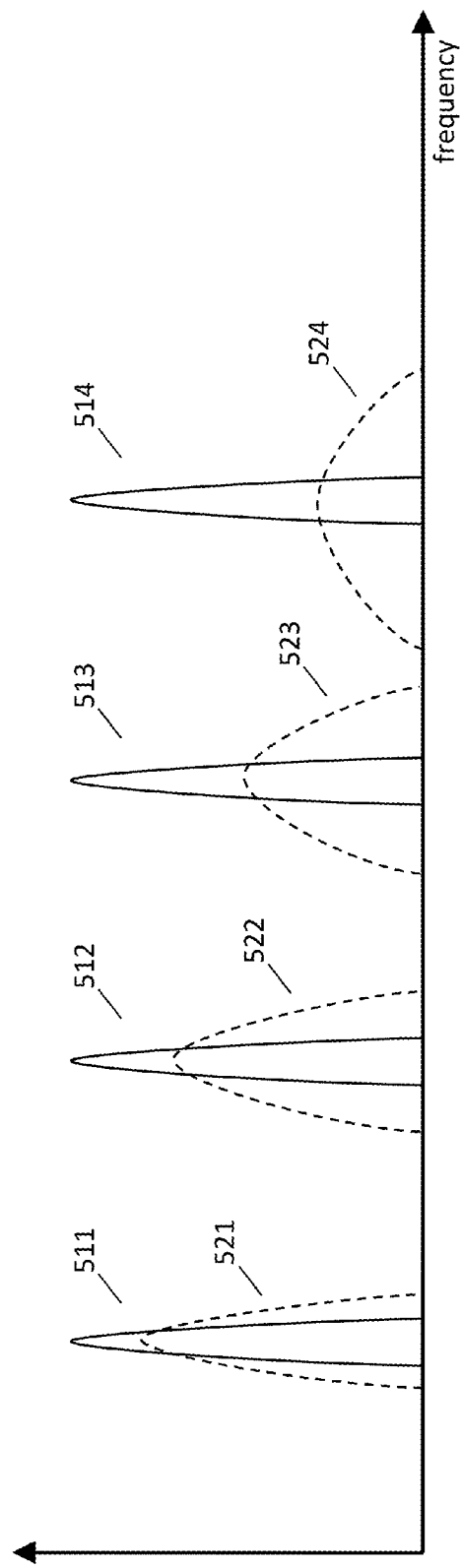
FIG. 5 illustrates two examples of a generalized spectrum of a signal.

FIG. 5 illustrates hypothetical generalized spectra (or rows of the PVT) generated using two different values of fractional chirp rate for the harmonic signal 140 of FIG. 1. The four peaks (511, 512, 513, 514) illustrate the generalized spectrum where the fractional chirp rate matches the fractional chirp rate of the signal, and this may be referred to as a stationary spectrum. Because the fractional chirp rate of the row of the generalized spectrum matches the fractional chirp rate of the signal (i) the width of the four peaks may be narrower than the generalized spectra for other fractional chirp rate values, and (ii) the height of the four peaks may be higher than the generalized spectra for other fractional chirp rate values. Because the peaks may be narrower and higher they may be easier to detect than for other generalized spectra. The peaks of stationary spectrum may be narrower and higher because the stationary spectrum may have the effect of removing the fractional chirp rate of the signal.

The four peaks (521, 522, 523, 524) illustrate a generalized spectrum for a fractional chirp rate that is different from the fractional chirp rate of the signal. Because the fractional chirp rate of the generalized spectrum does not match the signal, the peaks may be shorter and wider.

Figure 6:
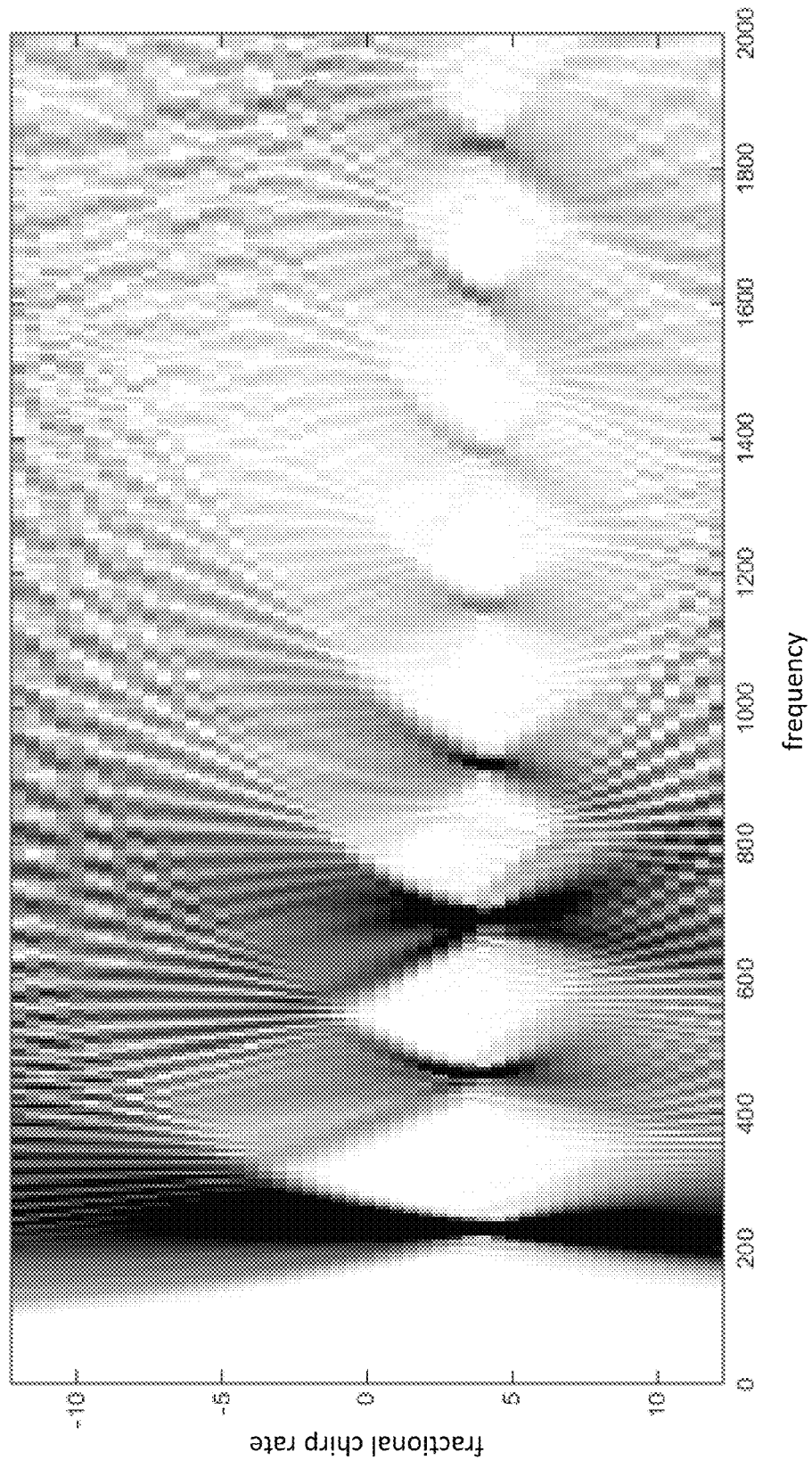
FIG. 6 illustrates a pitch velocity transform of a speech signal.

FIG. 6 illustrates a PVT of the signal from FIG. 2 at approximately 0.21 seconds. At this time, the signal has a pitch of approximately 230 Hz and a fractional chirp rate of approximately 4. The PVT shows features of the signal for each of the harmonics. For example, the PVT shows the first harmonic at approximately 230 Hz on the frequency axis and 4 on the fractional chirp rate axis. Similarly, the PVT shows the second harmonic at approximately 460 Hz on the frequency axis and 4 on the fractional chirp rate axis, and so forth. At frequencies between the harmonics, the PVT has lower values because the signal energy is lower in these regions. At fractional chirp rates different from 4, the PVT has lower values because the fractional chirp rate of the PVT does not match the fractional chirp rate of the signal.

Figure 7:
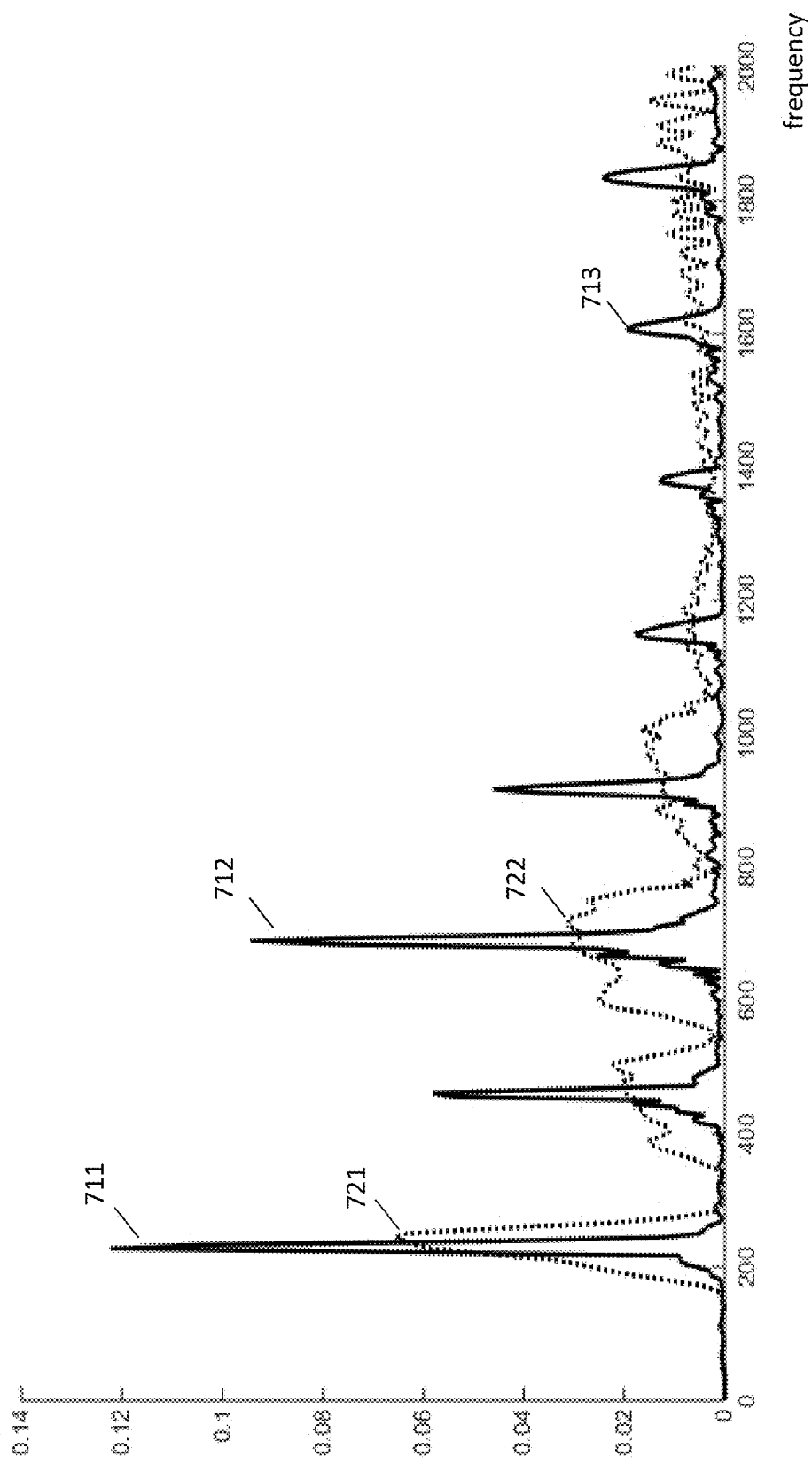
FIG. 7 illustrates two examples of generalized spectra of a speech signal.

FIG. 7 illustrates two generalized spectra corresponding to rows of the PVT of FIG. 6. The solid line corresponds to a generalized spectrum where the fractional chirp rate matches the fractional chirp rate of the signal (a fractional chirp rate of about 4) or the stationary spectrum. The dashed line corresponds to a generalized spectrum with a fractional chirp of zero, which will be referred to as the zero generalized spectrum (and may correspond to a short-time Fourier transform of the signal). The peaks of the stationary spectrum are higher and narrower than the peaks of the zero generalized spectrum. For the first harmonic, the peak 711 of the stationary spectrum is about twice the height and one-third the width of peak 721 of the zero generalized spectrum. For the third harmonic, the difference between the peak 712 of the stationary spectrum and peak 722 of the zero generalized spectrum is even greater. For the seventh harmonic, the peak 713 of the stationary spectrum is clearly visible, but the peak of the zero generalized spectrum is not visible.

The features of different generalized spectra (or rows of the PVT) may be used to determine a fractional chirp rate of the signal. As noted above, the peaks of the generalized spectrum may be narrower and higher for the correct value of the fractional chirp rate. Techniques for measuring narrower and higher peaks of a signal may thus be used for estimating the fractional chirp rate of a signal.

To estimate fractional chirp rate, a function may be used that takes a vector (e.g., a spectrum) as input and outputs one or more scores according to some criteria. Let $g(\ )$ be a function that takes a vector as input (such as a generalized spectrum or row of a PVT) and outputs a one or more values or scores corresponding to the input. In some implementations, the output of $g(\ )$ may be a number that indicates a peakiness of the input. For example, $g(\ )$ may correspond to entropy, Fisher information, Kullback-Leibler divergence, or a magnitude of the input to a fourth or higher power. Using the function $g(\ )$ the fractional chirp rate of a signal may be estimated from the PVT using the following:

$$\hat{\chi} = \arg\max_\chi g(P(f, \chi))$$

where $\hat{\chi}$ is an estimate of the fractional chirp rate. The function g( ) may be computed for multiple rows of the PVT, and the row producing the highest value of g( ) may be selected as corresponding to an estimated fractional chirp rate of the signal.

The estimate of the fractional chirp rate may also be computed from a frequency chirp distribution, such as the frequency chirp distribution described above:

$$\hat{\chi} = \arg\max_{\chi} g(FC(f, \chi f))$$

The estimate of the fractional chirp rate may also be computed from a generalized spectrum:

$$\hat{\chi} = \arg\max_{\chi} g(X_\chi(f))$$

The estimate of the fractional chirp rate may also be computed using inner products of the signal with the function $\psi(\ )$:

$$\hat{\chi} = \arg\max_{\chi} g(\langle x, \psi(f, \chi f)\rangle)$$

As described above, each of the PVT, the frequency chirp rate distribution, and the generalized spectrum may be computed using a variety of techniques. In some implementations, these quantities may be determined by computing an inner product of a signal with a chirplet, but the techniques described herein are not limited to that particular implementation. For example, functions other than chirplets may be used and measures of similarity other than an inner product may be used.

In some implementations, a generalized spectrum may be modified before being used to determine the fractional chirp rate of the signal. For example, a log likelihood ratio (LLR) spectrum may be computed from the generalized spectrum, and the LLR spectrum may be denoted as $LLR_\chi(f)$. An LLR spectrum may use hypothesis testing techniques to improve a determination of whether a harmonic is present at a frequency of a spectrum. For example, to determine whether a harmonic is present at the frequencies of the stationary spectrum shown in FIG. 7, one could compare the value of the spectrum to a threshold. Using an LLR spectrum may improve this determination.

An LLR spectrum may be computed using a log likelihood ratio of two hypotheses: (1) a harmonic is present at a frequency of the signal, and (2) a harmonic is not present at a frequency of the signal. For each of the two hypotheses, a likelihood may be computed. The two likelihoods may be compared to determine whether a harmonic is present, such as by computing a ratio of the logs of the two likelihoods.

In some implementations, the log likelihood for a harmonic being present at a frequency of the signal may be computed by fitting a Gaussian to the signal spectrum at the frequency and then computing a residual sum of squares between the Gaussian and the signal. To fit a Gaussian to a spectrum at a frequency, the Gaussian may be centered at the frequency, and then an amplitude of the Gaussian may be computed using any suitable techniques for estimating these parameters. In some implementations, a spread in frequency or duration of the Gaussian may match a window used to compute signal spectrum or the spread of the Gaussian may also be determined during the fitting process. For example, when fitting a Gaussian to peak 711 of the stationary spectrum in FIG. 7, the amplitude of the Gaussian may be approximately 0.12 and the duration of the Gaussian may correspond approximately to the duration of the peak (or the window used to compute the spectrum). The log likelihood may then be computed by computing a residual sum of squares between the Gaussian and the signal spectrum in a window around the frequency for which the likelihood is being computed.

In some implementations, the log likelihood for a harmonic not being present at a frequency may correspond to computing a residual sum of squares between a zero spectrum (a spectrum that is zero at all frequencies) and the signal spectrum in a window around the frequency for which the likelihood is being computed.

The LLR spectrum may be determined by computing the two likelihoods for each frequency of the signal spectrum (such as a generalized spectrum) and then computing a logarithm (e.g., natural logarithm) of the ratio of the two likelihoods. Other steps may be performed as well, such as estimating a noise variance in the signal and using the estimated noise variance to normalize the log likelihoods. In some implementations, an LLR spectrum for a frequency f may be computed as $$LLR(f) = \frac{1}{2\sigma_{noise}^2}\left(X^h X - (X - \hat{G}_f)^h(X - \hat{G}_f)\right)$$

where $\sigma_{noise}^2$ is an estimated noise variance, X is a spectrum, h is a Hermitian transpose, and $\hat{G}_f$ is a best fitting Gaussian to the spectrum at frequency f.

Figure 8:
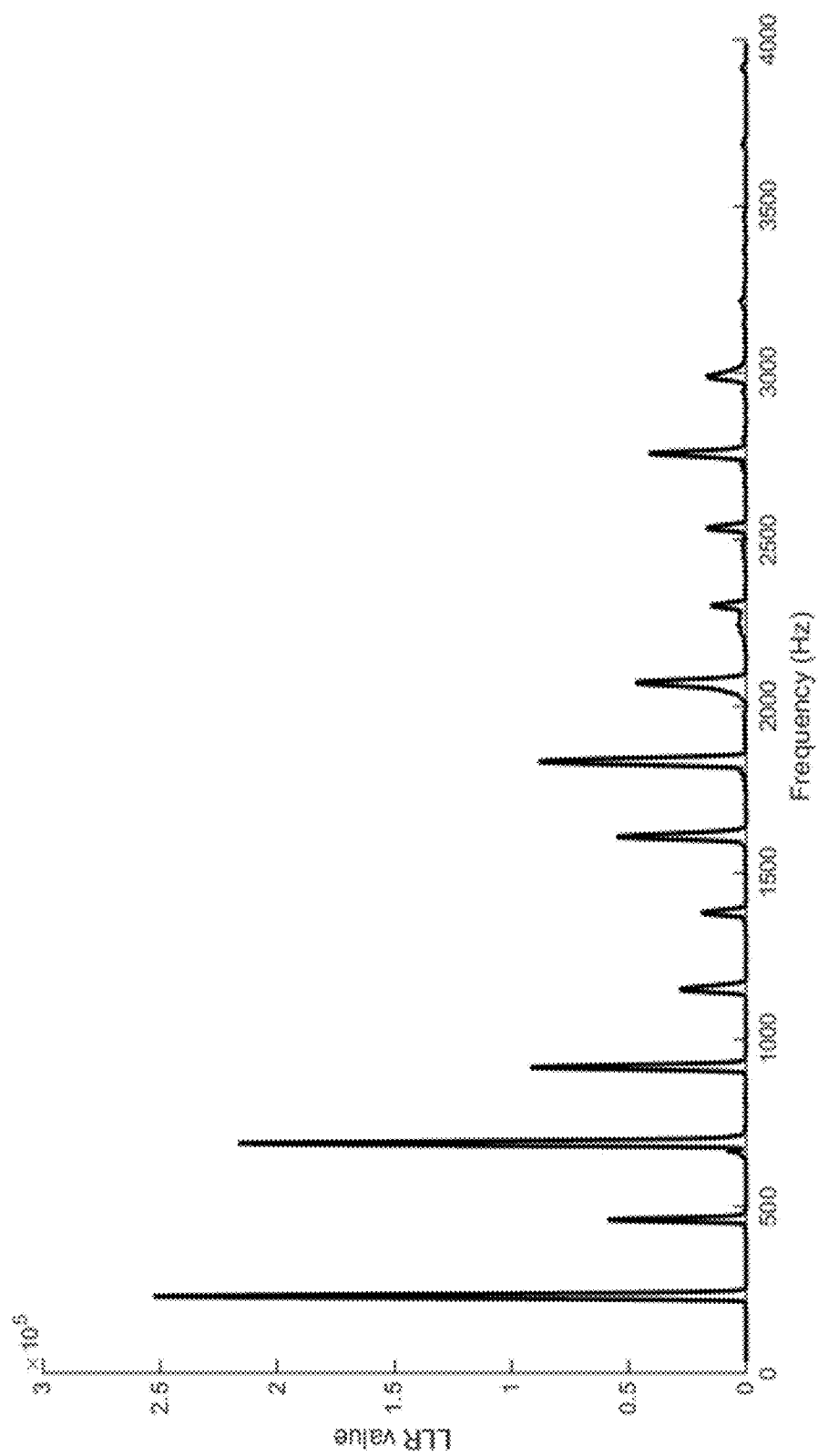
FIG. 8 illustrates an LLR spectrum of a speech signal.

FIG. 8 illustrates an example of an LLR spectrum corresponding to the stationary spectrum of FIG. 7. For each frequency, the LLR spectrum has a high value where a harmonic is present and a low value when a harmonic is not present. The LLR spectrum may provide a better determination than other spectra (such as a generalized or stationary spectra) of whether harmonics are present at different frequencies.

The estimate of the fractional chirp rate may also be computed using the LLR spectrum:

$$\hat{\chi} = \arg\max_{\chi} g(LLR_\chi(f))$$

To illustrate some possible implementations of estimating fractional chirp rate, examples of the function g( ) will be provided. The examples below will use the generalized spectrum, but other spectra, such as the LLR spectrum may be used as well.

In some implementations, the fractional chirp rate may be estimated using a magnitude to the fourth power of the generalized spectrum:

$$g(X_\chi(f)) = \int |X_\chi(f)|^4 df$$

In some implementations, the function g( ) may comprise at least some of the following sequence of operations: (1) compute $|X_\chi(f)|^2$ (may be normalized by dividing by the total energy of the signal or some other normalization value); (2) compute an auto-correlation of $|X_\chi(f)|^2$ denoted as $r_\chi(\tau)$; and (3) compute the Fisher information, entropy, Kullback-Leibler divergence, sum of squared (or magnitude squared) values of $r_X(\tau)$, or a sum of squared second derivatives of $r_X(\tau)$. The foregoing examples are not limiting and other variations are possible. For example, in step (1), $X_\chi(f)$ or its magnitude, or real or imaginary parts may be used in place of $|X_\chi(f)|^2$.

Accordingly, the fractional chirp rate of a signal may be determined using any combinations of the above techniques or any similar techniques known to one of skill in the art.

In addition to estimating a fractional chirp rate of the signal, a pitch of the signal may also be estimated. In some implementations, the fractional chirp rate may be estimated first, and the estimated fractional chirp rate may be used in estimating the pitch. For example, after estimating the fractional chirp rate, denoted as $\hat{\chi}$, the generalized spectrum corresponding to the estimated fractional chirp rate may be used to estimate a pitch.

When estimating pitch, it is possible that the pitch estimate may be different from the true pitch by an octave, which may be referred to as an octave error. For example, if the true pitch is 300 Hz, the pitch estimate may be 150 Hz or 600 Hz. To avoid octave errors, a two-step approach may be used to estimate pitch. First, a coarse pitch estimate may be determined to obtain an estimate that may be less accurate but less susceptible to octave errors, and second, a precise pitch estimate may be used to refine the coarse pitch estimate.

A coarse pitch estimate may be determined by computing peak-to-peak distances of a spectrum, such as a generalized spectrum or an LLR spectrum (corresponding to the estimate of the fractional chirp rate). For clarity in the following explanation, the LLR spectrum will be used as an example spectrum, but the techniques described herein are not limited to the LLR spectrum and any appropriate spectrum may be used.

When computing peak-to-peak distances in a spectrum, it may not always be clear which peaks correspond to the signal and which peaks correspond to noise. Including too many peaks that correspond to noise or excluding too many peaks that correspond to signal may reduce the accuracy of the coarse pitch estimate. Although the example LLR spectrum in FIG. 8 has low noise, for signals with higher noise levels, additional peaks caused by noise may also be present.

Figure 9A:
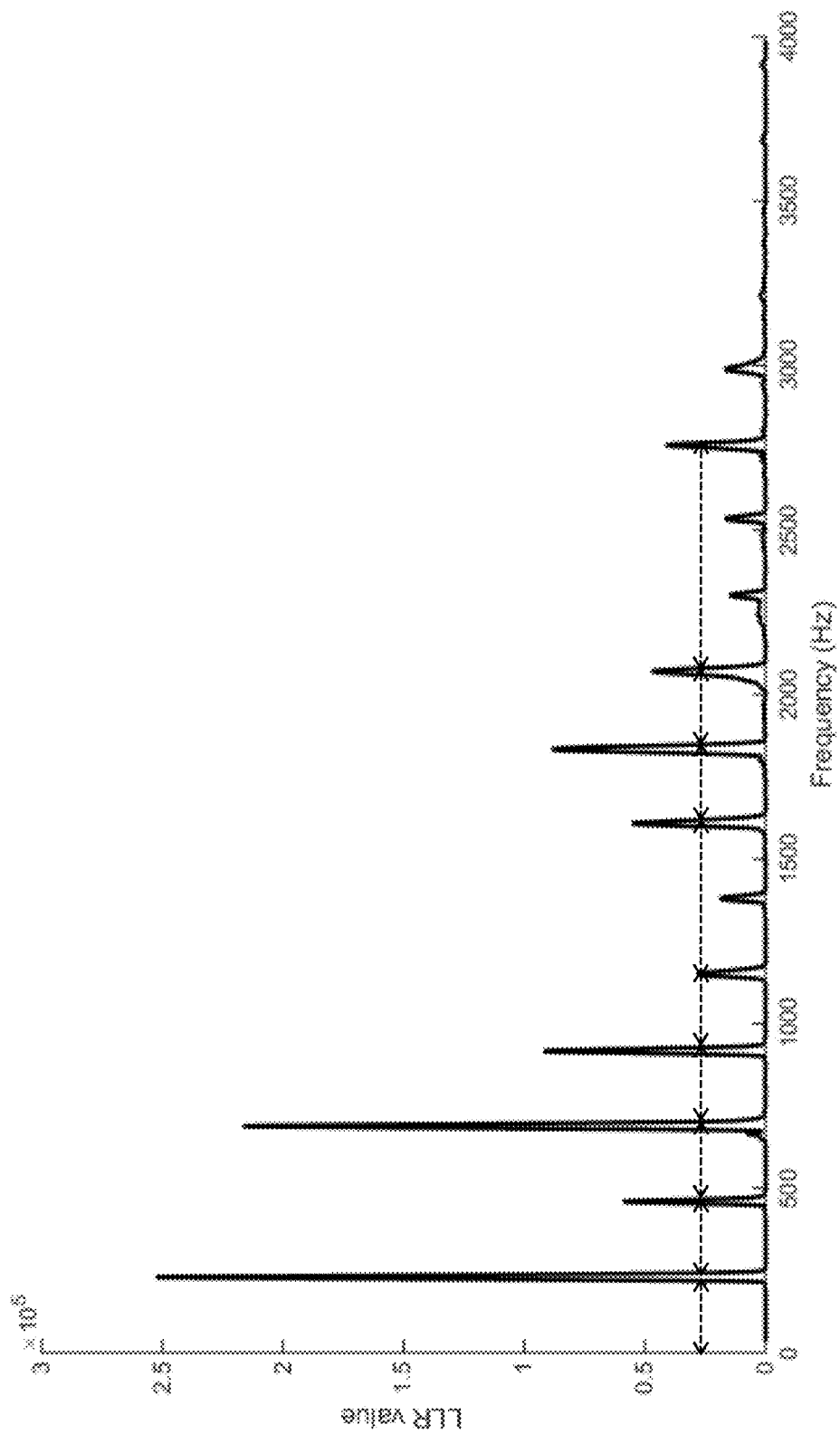
FIG. 9A illustrates peak-to-peak distances for a single threshold in an LLR spectrum of a speech signal.

In some implementations, peaks may be selected from the LLR spectrum using thresholds. For example, a standard deviation (or variance) of the noise in the spectrum may be determined and a threshold may be computed or selected using the standard deviation of the noise, such as setting the threshold to a multiple or fraction of the standard deviation (e.g., set a threshold to twice the standard deviation of the noise). After choosing a threshold, peak-to-peak distances may be determined. For example, FIG. 9A shows peak-to-peak distances for a threshold of approximately 0.3. At this threshold, the first 5 peak-to-peak distances are about 230 Hz, the sixth is about 460 Hz, the seventh and eighth are about 230 Hz, and the ninth is about 690 Hz. After determining the peak-to-peak distances, a most frequently occurring peak-to-peak distance may be selected as the coarse pitch estimate. For example, a histogram may be computed with bins with a width of 2-5 Hz, and the histogram bin with the largest number of counts may be selected as the coarse pitch estimate.

Figure 9B:
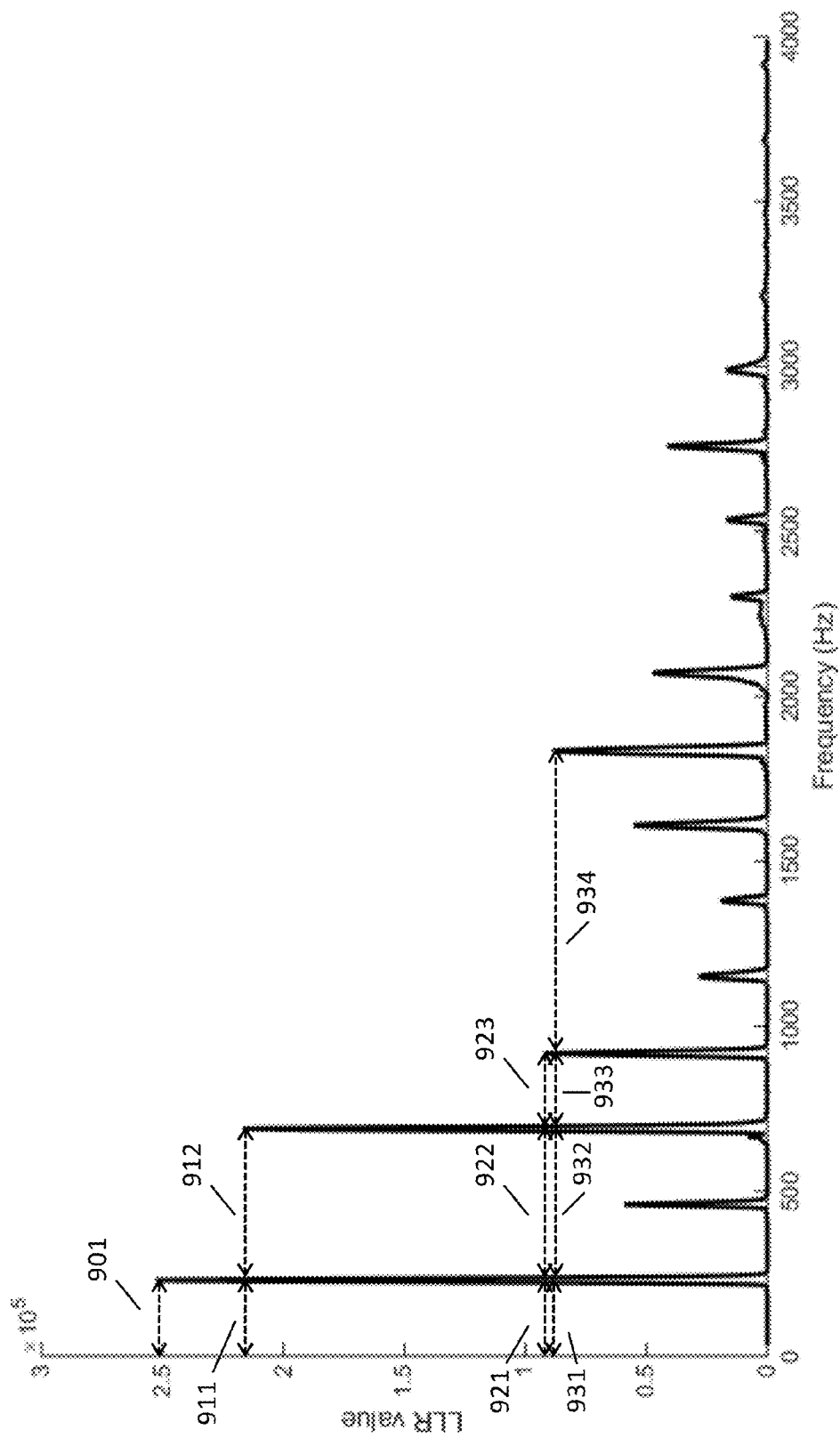
FIG. 9B illustrates peak-to-peak distances for multiple thresholds in an LLR spectrum of a speech signal.

In some implementations, multiple thresholds may be used as illustrated in FIG. 9B. For example, thresholds may be selected using the heights of the peaks in the LLR spectrum, such as the ten highest peaks or all peaks above a second threshold (e.g., above twice the standard deviation of the noise). Peak-to-peak distances may be computed for each of the thresholds. In FIG. 9B, peak-to-peak distance 901 is determined using the tallest peak as a threshold, peak-to-peak distances 911 and 912 are determined using the second tallest peak as a threshold, peak-to-peak distances 921, 922, and 923 are determined using the third tallest peak as a threshold, and so forth. As above, a most frequently occurring peak-to-peak distance may be selected as the coarse pitch estimate, for example, by using a histogram.

In some implementations, peak-to-peak distances may be computed for multiple time frames for determining a coarse pitch estimate. For example, to determine a coarse pitch estimate for a particular frame, peak-to-peak distances may be computed for the current frame, five previous frames, and five subsequent frames. The peak-to-peak distances for all of the frames may be pooled together in determining a coarse pitch estimate, such as computing a histogram for all of the peak-to-peak distances.

In some implementations, peak-to-peak distances may by computed using different smoothing kernels on the spectrum. Applying a smoothing kernel to a spectrum may reduce peaks caused by noise but may also reduce peaks caused by signal. For noisy signals, a wider kernel may perform better and, for less noisy signals, a narrower kernel may perform better. It may not be known how to select an appropriate kernel width, and thus peak-to-peak distances may be computed from a spectrum for each of a specified group of kernel widths. As above, the peak-to-peak distances for all of the smoothing kernels may be pooled together in determining a coarse pitch estimate.

Accordingly, peak-to-peak distances may be computed in a variety of ways including, but not limited to, different thresholds, different time instances (e.g., frames), and different smoothing kernels. From these peak-to-peak distances, a coarse pitch estimate may be determined. In some implementations, a coarse pitch estimate may be determined as the frequency corresponding to the mode of the histogram for all computed peak-to-peak distances.

In some implementations, a coarse pitch estimate may be determined by estimating a cumulative distribution function (CDF) and/or a probability density function (PDF) of the peak-to-peak distances instead of using a histogram. For example, a CDF for pitch may be estimated as follows. For any pitch values smaller than the smallest peak-to-peak distance, the CDF will be zero and for any pitch values larger than the largest peak-to-peak distance, the CDF will be one. For a pitch value in between these two bounds, the CDF may be estimated as the cumulative number of peak-to-peak distances smaller than the pitch value divided by the total number of peak-to-peak distances. For example, consider the peak-to-peak distances illustrated in FIG. 9A. FIG. 9A shows a total of 9 peak-to-peak distances, including 7 peak-to-peak distances of 230 Hz, 1 peak-to-peak distance of 460 Hz, and 1 peak-to-peak distance of 690 Hz. A CDF may be estimated as having a value of 0 for frequencies less that 230 Hz, a value of 7/9 for frequencies between 230 Hz and 460 Hz, a value 8/9 for frequencies between 460 Hz and 690 Hz, and a value of 1 for frequencies above 690 Hz.

This estimated CDF may resemble a step function, and accordingly the CDF may be smoothed using any appropriate smoothing technique, such as spline interpolation, low-pass filtering, or LOWESS smoothing. The coarse pitch estimate may be determined as the pitch value corresponding to the largest slope of the CDF.

In some implementations, a PDF may be estimated from the CDF by computing a derivative of the CDF and any appropriate techniques may be used for computing the derivative. The coarse pitch estimate may then be determined as the pitch value corresponding to the peak of the PDF.

In some implementations, multiple preliminary coarse pitch estimates may be determined, and an actual coarse pitch estimate may be determined using the preliminary pitch estimates. For example, an average of the preliminary coarse pitch estimates or a most common coarse pitch estimate may be selected as the actual coarse pitch estimate. For example, a coarse pitch estimate may be computed for each of a group of threshold values. For high threshold values, the coarse pitch estimate may be too high, and for low threshold values, the coarse pitch estimate may be too low. For thresholds in between, the coarse pitch estimate may be more accurate. To determine an actual coarse pitch estimate, a histogram may be computed of the multiple preliminary coarse pitch estimates, and the actual coarse pitch estimate may correspond to the frequency of the mode of the histogram. In some implementations, outliers may be removed from the histogram to improve the actual coarse pitch estimate.

After obtaining a coarse pitch estimate, a precise pitch estimate may be obtained using the coarse pitch estimate as a starting point. A precise pitch estimate may be determined using the shape of each harmonic in a spectrum (again, any appropriate spectrum may be used, such as a generalized spectrum, a stationary spectrum, or an LLR spectrum). To compare the shapes of harmonics in the spectrum, portions of the spectrum may be extracted as shown in FIG. 10A and FIG. 10B.

Figure 10A:
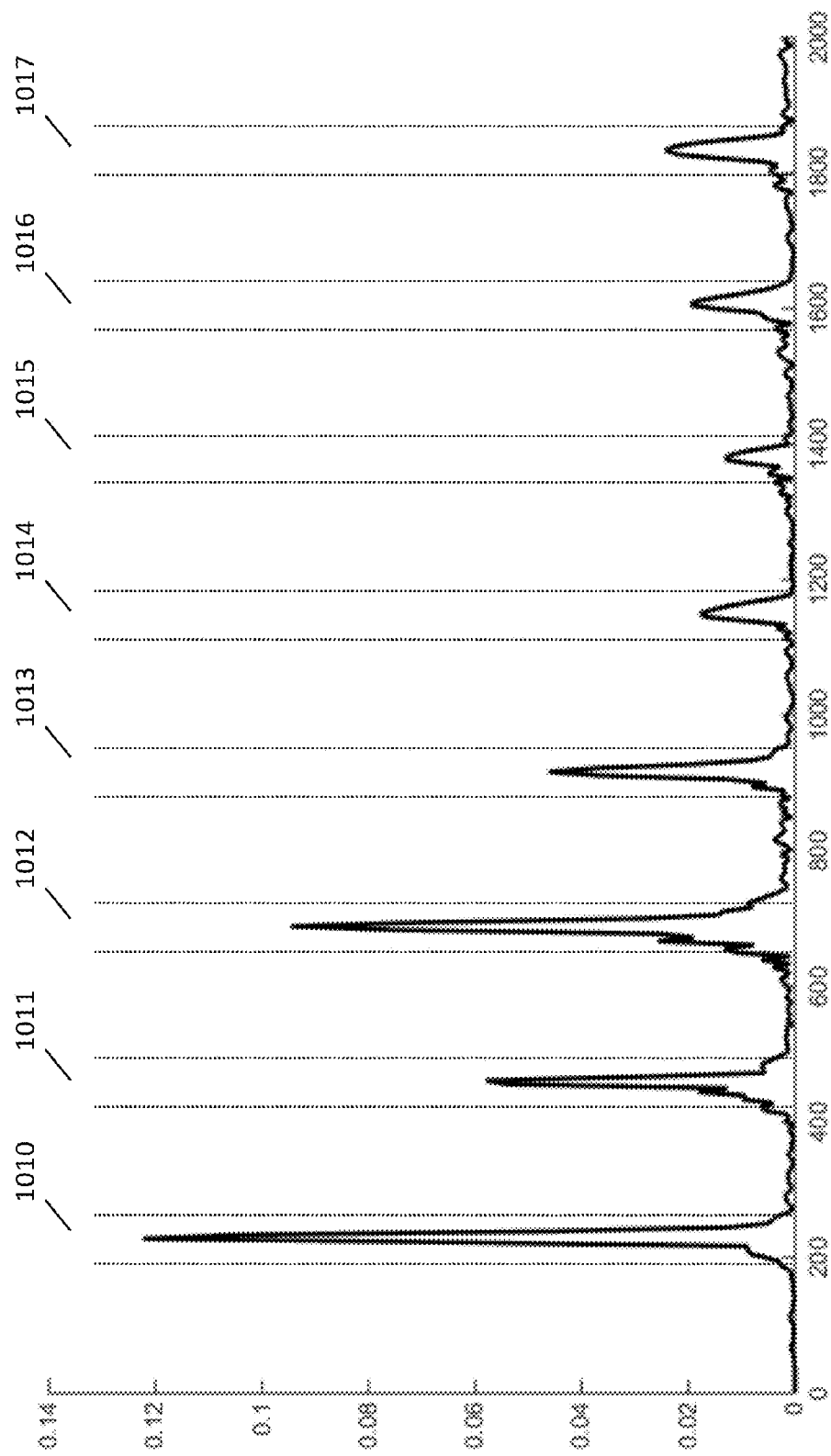
FIG. 10A illustrates frequency portions of a frequency representation of a speech signal for a first pitch estimate.

FIG. 10A illustrates portions of a spectrum for a first pitch estimate, where the pitch estimate is very close to the true pitch of the signal. Suppose that the true pitch of the signal is about 230 Hz and the pitch estimate is also about 230 Hz. A portion of the spectrum for each harmonic can be identified by using a multiple of the estimated pitch. In FIG. 10A, the portion 1010 is at approximately 230 Hz, the portion 1011 is at approximately 460 Hz, and portions 1012-1017 are each at higher multiples of 230 Hz. Because the pitch estimate is accurate, each harmonic is approximately centered in the middle of each portion. Examples of estimating pitch in audio signals based on symmetry characteristics are described in U.S. patent application Ser. No. 14/502,844, filed on Sep. 30, 2014 and entitled "SYSTEMS AND METHODS FOR ESTIMATING PITCH IN AUDIO SIGNALS BASED ON SYMMETRY CHARACTERISTICS INDEPENDENT OF HARMONIC AMPLITUDES," which is incorporated herein by reference in its entirety.

Figure 10B:
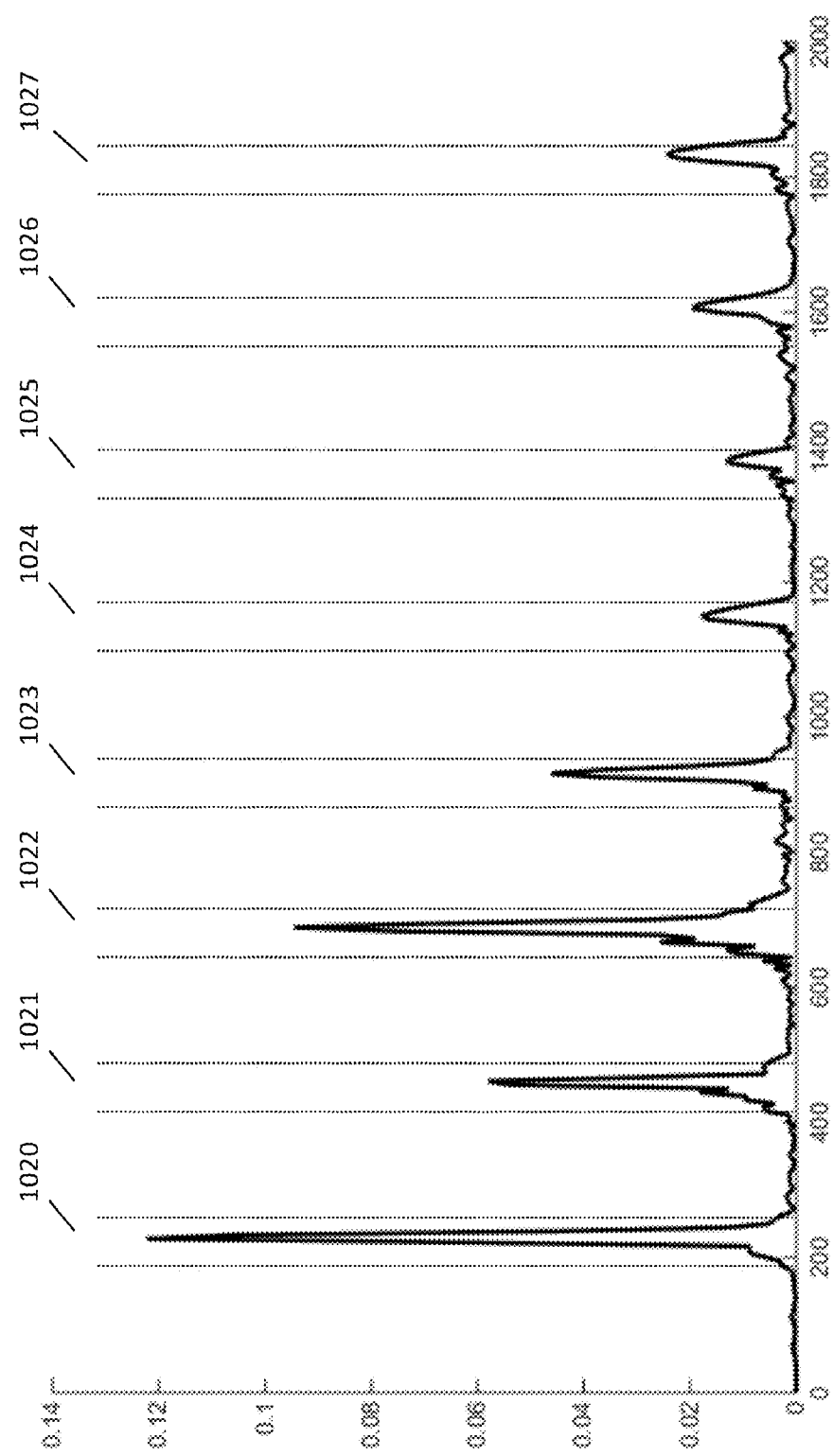
FIG. 10B illustrates frequency portions of a frequency representation of a speech signal for a second pitch estimate.

FIG. 10B illustrates portions of a spectrum for a second pitch estimate, where the pitch estimate is slightly lower than the true pitch of the signal. For example, the pitch estimate may be 228 Hz and the actual pitch may be 230 Hz. Again, a portion of the spectrum for each harmonic can be identified using multiples of the pitch estimate. For each harmonic, the portion is slightly to the left of the true position of the harmonic and the offset increases as the harmonic number increases. Portion 1020 is about 2 Hz to the left of the true position of the first harmonic, portion 1021 is about 4 Hz to the left of the true position of the second harmonic, and portions 1022-1027 are each increasingly further to the left as the harmonic number increases. For example, portion 1027 is about 16 Hz to the left of the true position of the eighth harmonic.

The frequency portions from FIGS. 10A and 10B can be used to determine the accuracy of a pitch estimate. When the pitch estimate is accurate, as in FIG. 10A, each harmonic is centered in a frequency portion and thus the frequency portions all have similar shapes. When the pitch estimate is not accurate, as in FIG. 10B, each harmonic is off center in the frequency portion and is more off center as the harmonic number increases. Thus, when the pitch estimate is less accurate, the frequency portions are less similar to one another.

In addition to comparing the shape of a first frequency portion with a second frequency portion, a frequency portion may be compared to a reversed version of itself since the shape of a harmonic is generally symmetric. For an accurate pitch estimate, a harmonic will be centered in a frequency portion, and thus reversing the portion will provide a similar shape. For an inaccurate pitch estimate, the harmonic will not be centered in the frequency portion, and reversing the portion will result in a different shape. Similarly, a first frequency portion can be compared to a reversed version of a second frequency portion.

The frequency portions may have any appropriate width. In some implementations, the frequency portions may partition the spectrum, may overlap adjacent portions, or may have gaps between them (as shown in FIGS. 10A and 10B). The frequency portions used may correspond to any frequency representation, such as a spectrum of a signal or a real part, imaginary part, magnitude, or magnitude squared of a spectrum of a signal. The frequency portions may also be normalized to remove differences that are less relevant to determining pitch. For example, for each frequency portion a mean and a standard deviation may be determined, and the frequency portion may be normalized by subtracting the mean value and then dividing by the standard deviation (e.g., a z-score).

Correlations may be used to measure whether two frequency portions have similar shapes and to determine if a harmonic is centered at the expected frequency. The frequency portions for a pitch estimate may be determined as described above, and a correlation may be performed by computing an inner product of two frequency portions. Correlations that may be performed include the following: a correlation of a first frequency portion with a second frequency portion, a correlation of a first frequency portion with a reversed version of itself, and a correlation of a first frequency portion with a reversed version of a second frequency portion.

The correlations may have higher values for more accurate pitch estimates and lower values for less accurate pitch estimates. For a more accurate pitch estimate, the frequency portions will have a greater similarity to each other and reversed versions of each other (e.g., each harmonic being centered in a frequency portion) and thus the correlations may be higher. For a less accurate pitch estimate, the frequency portions will have less similarity to each other and reversed versions of each other (e.g., each harmonic being off center by an amount corresponding to the harmonic number) and thus correlations may be lower.

Each of the correlations may be computed, for example, by performing an inner product of the two frequency portions (or with a frequency portion and a reversed version of that frequency portion of another frequency portion). The correlation may also be normalized by dividing by N−1 where N is the number of samples in each frequency portion. In some implementations, a Pearson product-moment correlation coefficient may be used.

Some or all of the above correlations may be used to determine a score for an accuracy of a pitch estimate. For example, for eight harmonics, eight correlations may be computed for the correlation of a frequency portion with a reversed version of itself, 28 correlations may be computed for a correlation between a frequency portion and another frequency portion, and 28 correlations may be computed between a frequency portion and a reversed version of another frequency portion. These correlations may be combined in any appropriate way to get an overall score for the accuracy of a pitch estimate. For example, the correlations may be added or multiplied to get an overall score.

In some implementations, the correlations may be combined using the Fisher transformation. The Fisher transformation of an individual correlation, r, may be computed as $$F(r) = \frac{1}{2}\log\left(\frac{1+r}{1-r}\right)$$

In the region of interest for an individual correlation, the Fisher transformation may be approximated as $$F(r) \approx r$$

The Fisher transformation of an individual correlation may have a probability density function that is approximately Gaussian with a standard deviation of $1/\sqrt{N-3}$ where N is the number of samples in each portion. Accordingly, using the above approximation, the probability density function of the Fisher transformation of an individual correlation, f(r), may be represented as $$f(r) = \sqrt{\frac{N-3}{2\pi}} e^{-\frac{1}{2}(N-3)r^2}$$

An overall score may then be computed by computing f(r) for each correlation and multiplying them together. Accordingly, if there are M correlations, then an overall score, S, may be computed as a likelihood $$S = \prod_{i=1}^{M} f(r_i)$$

or alternatively, the score, S, may be computed as a log likelihood $$S = \sum_{i=1}^{M} \log f(r_i)$$

These scores may be used to obtain a precise pitch estimate through an iterative procedure, such as a golden section search or any kind of gradient descent algorithm. For example, the precise pitch estimate may be initialized with the coarse pitch estimate. A score may be computed for the current precise pitch estimate and for other pitch values near the precise pitch estimate. If the score for another pitch value is higher than the score of the current pitch estimate, then the current pitch estimate may be set to that other pitch value. This process may be repeated until an appropriate stopping condition has been reached.

In some implementations, the process of determining the precise pitch estimate may be constrained, for example, by requiring the precise pitch estimate to be within a range of the coarse pitch estimate. The range may be determining using any appropriate techniques. For example, the range may be determined from a variance or a confidence interval of the coarse pitch estimate, such as determining a confidence interval of the coarse pitch estimate using bootstrapping techniques. The range may be determined from the confidence interval, such as a multiple of the confidence interval. In determining the precise pitch estimate, the search may be limited so that the precise pitch estimate never goes outside of the specified range.

In some implementations, after determining a fractional chirp rate and a pitch, it may be desired to estimate amplitudes of harmonics of the signal (which may be complex valued and include phase information). Each of the harmonics may be modeled as a chirplet, where the frequency and chirp rate of the chirplet are set using the estimated pitch and estimate fractional chirp rate. For example, for the $k^{th}$ harmonic, the frequency of the harmonic may be k times the estimated pitch, and the chirp rate of the harmonic may be the fractional chirp rate times the frequency of the chirplet. Any appropriate duration may be used for the chirplet.

The amplitudes of the harmonics may be estimated using any appropriate techniques, including, for example, maximum likelihood estimation. In some implementations, a vector of harmonic amplitudes, â, may be estimated as $$\hat{a} = (MM^h)^{-1}Mx$$

where M is a matrix where each row corresponds to a chirplet for each harmonic with parameters as described above, the number of rows of the matrix M corresponds to the number of harmonic amplitudes to be estimated, h is a Hermitian transpose, and x is a time series representation of the signal. The estimate of the harmonic amplitudes may be complex valued, and in some implementations, other functions of the amplitudes may be used, such as a magnitude, magnitude squared, real part, or imaginary part.

In some implementations, the amplitudes may have been computed in previous steps and need not be explicitly computed again. For example, where an LLR spectrum is used in previous processing steps, the amplitudes may be computed in computing the LLR spectrum. The LLR spectrum is computed by fitting Gaussians to a spectrum, and one fitting parameter of the Gaussian is the amplitude of the Gaussian. The amplitudes of the Gaussians may be saved during the process of computing the LLR spectrum, and these amplitudes may be recalled instead of being recomputed. In some implementations, the amplitudes determined from the LLR spectrum may be a starting point, and the amplitudes may be refined, for example, by using iterative techniques.

The above techniques may be carried out for successive portions of a signal to be processed, such as for a frame of the signal every 10 milliseconds. For each portion of the signal that is processed, a fractional chirp rate, pitch, and harmonic amplitudes may be determined. Some or all of the fractional chirp rate, pitch, and harmonic amplitudes may be referred to as HAM (harmonic amplitude matrix) features and a feature vector may be created that comprises the HAM features. The feature vector of HAM features may be used in addition to or in place of any other features that are used for processing harmonic signals. For example, the HAM features may be used in addition to or in place of mel-frequency cepstral coefficients, perceptual linear prediction features, or neural network features. The HAM features may be applied to any application of harmonic signals, including but not limited to performing speech recognition, word spotting, speaker recognition, speaker verification, noise reduction, or signal reconstruction.

FIGS. 11-14 are flowcharts illustrating example implementations of the processes described above. Note that, for the flowcharts described below, the ordering of the steps is exemplary and that other orders are possible, not all steps are required and, in some implementations, some steps may be omitted or other steps may be added. The processes of the flowcharts may be implemented, for example, by one or more computers, such as the computers described below.

Figure 11:
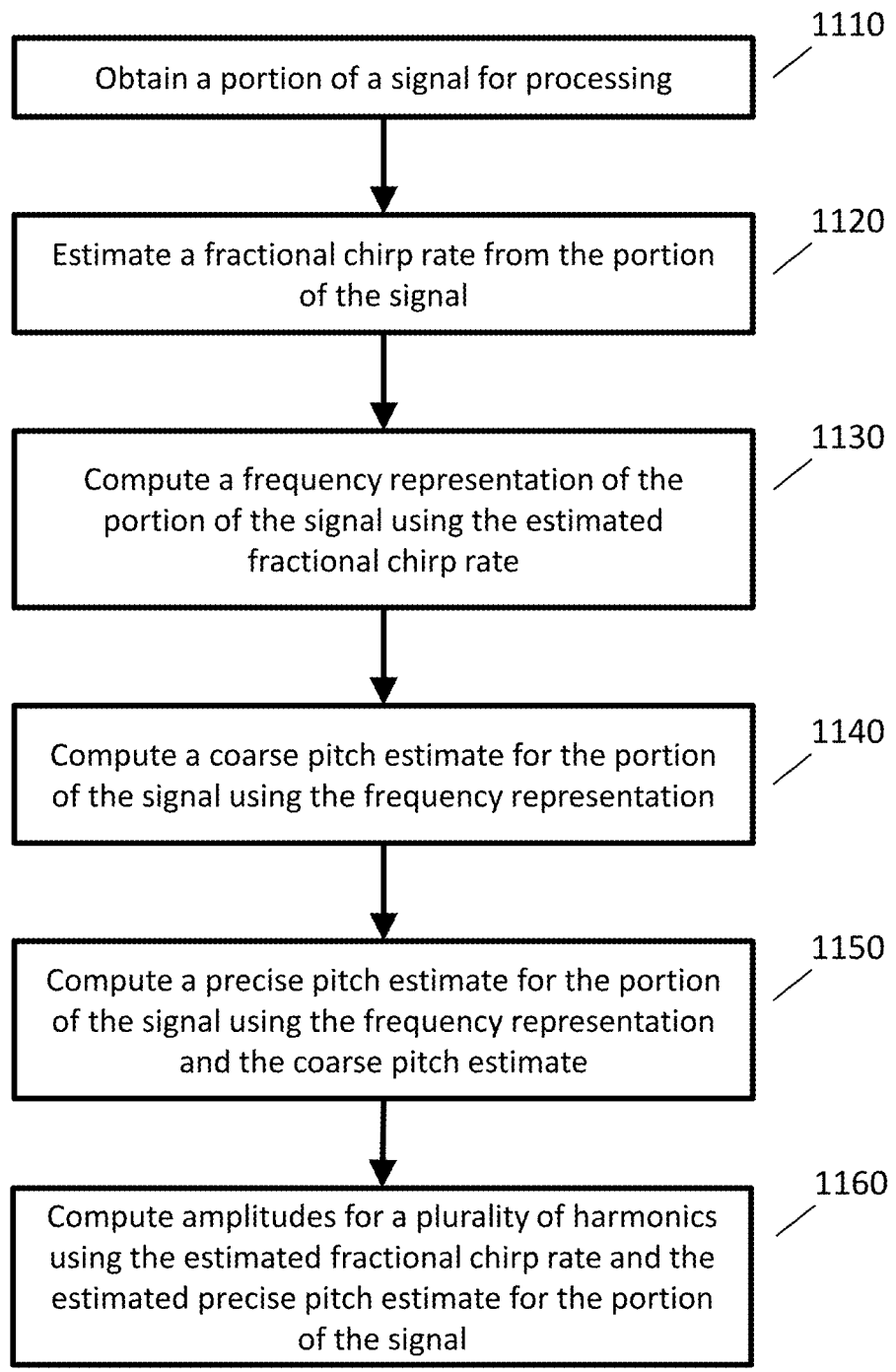
FIG. 11 is a flowchart showing an example implementation of computing features from a signal.

FIG. 11 is a flowchart showing an example implementation of computing features for a first portion of a signal. At step 1110, a portion of a signal is obtained. The signal may be any signal for which it may be useful to estimate features, including but not limited to speech signals or music signals. The portion may be any relevant portion of the signal, and the portion may be, for example, a frame of the signal that is extracted on regular intervals, such as every 10 milliseconds.

At step 1120, a fractional chirp rate of the portion of the signal is estimated. The fractional chirp rate may be estimated using any of the techniques described above. For example, a plurality of possible fractional chirp rates may be identified and a score may be computed for each of the possible fractional chirp rates. A score may be computed using a function, such as any of the functions g( ) described above. The estimate of the fractional chirp rate may be determined by selecting a fractional chirp rate corresponding to a highest score. In some implementations, a more precise estimate of fractional chirp rate may be determined using iterative procedures, such as by selecting additional possible fractional chirp rates and iterating with a golden section search or a gradient descent. The function g( ) may take as input any frequency representation of the first portion described above, including but not limited to a spectrum of the first portion, an LLR spectrum of the first portion, a generalized spectrum of the first portion, a frequency chirp distribution of the first portion, or a PVT of the first portion.

At step 1130, a frequency representation of the portion of the signal is computed using the estimated fractional chirp rate. The frequency representation may be any representation of the portion of the signal as a function of frequency. The frequency representation may be, for example, a stationary spectrum, a generalized spectrum, an LLR spectrum, or a row of a PVT. The frequency representation may be computed during the processing of step 1120 and need not be a separate step. For example, the frequency representation may be computed during other processing that determines an estimate of the fractional chirp rate.

At step 1140, a coarse pitch estimate is computed from the portion of the signal using the frequency representation. The coarse pitch estimate may be determined using any of the techniques described above. For example, peak-to-peak distances may be determined for any of the types of spectra described above and for a variety of parameters, such as different thresholds, different smoothing kernels, and from other portions of the signal. The coarse pitch estimate may then be computed from the peak-to-peak distances using a histogram or any of the other techniques described above.

At step 1150, a precise pitch estimate is computed from the portion of the signal using the frequency representation and the coarse pitch estimate. The precise pitch estimate may be initialized with the coarse pitch estimate and then refined with an iterative procedure. For each possible value of a precise pitch estimate, a score, such as a likelihood or a log likelihood, may be computed, and the precise pitch estimate may be determined by maximizing the score. The score may be determined using combinations of correlations as described above. The score may be maximized using any appropriate procedure, such as a golden section search or a gradient descent.

At step 1160, harmonic amplitudes are computed using the estimated fractional chirp rate and the estimated pitch. For example, the harmonic amplitudes may be computed by modeling each harmonic as a chirplet and performing maximum likelihood estimation.

The process of FIG. 11 may be repeated for successive portions or time intervals of the signal. For example, a fractional chirp rate, pitch, and harmonic amplitudes may be computed every 10 milliseconds. The fractional chirp rate, pitch, and harmonic amplitudes may be used for a wide variety of applications, including but not limited to pitch tracking, signal reconstruction, speech recognition, and speaker verification or recognition.

Figure 12:
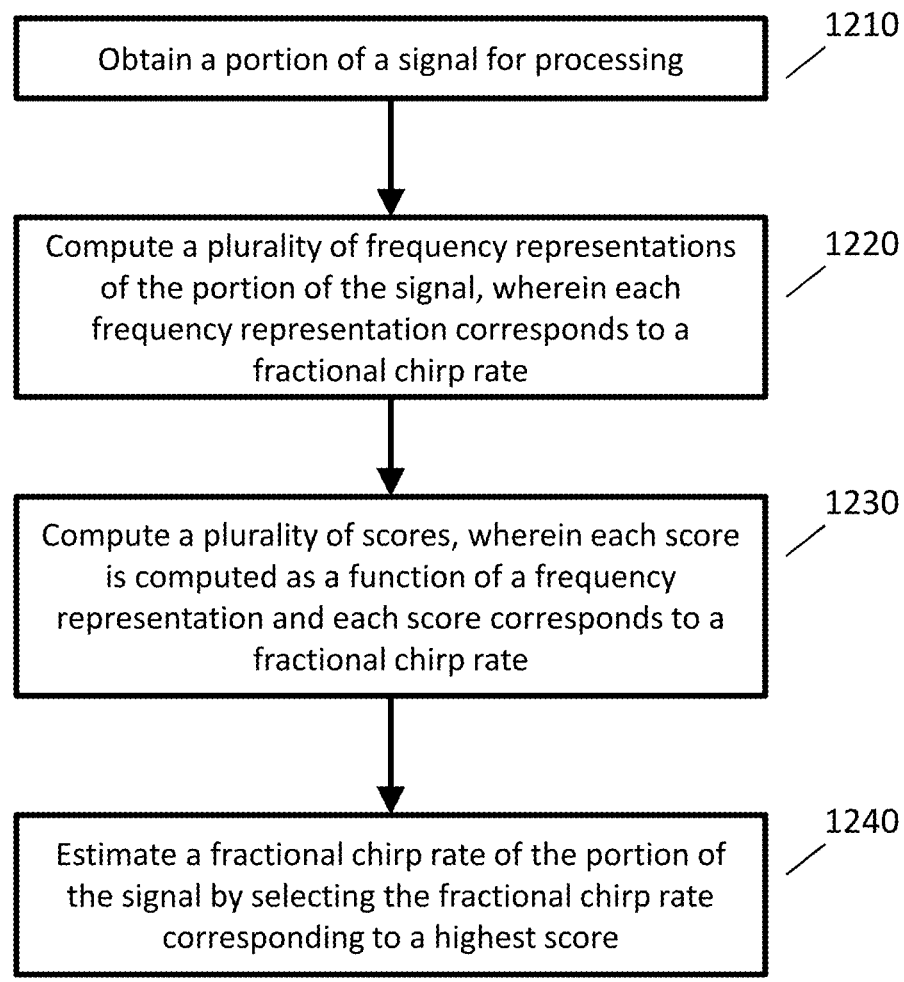
FIG. 12 is a flowchart showing an example implementation of estimating a fractional chirp rate from a signal.

FIG. 12 is a flowchart showing an example implementation of computing fractional chirp rate of a portion of a signal. At step 1210, a portion of a signal is obtained, as described above.

At step 1220, a plurality of frequency representations of the portion of the signal are computed, and the frequency representations may be computed using any of the techniques described above. Each of the frequency representations may correspond to a fractional chirp rate. In some implementations, the frequency representations may be computed (i) from the rows of a PVT, (ii) from radial slices of a frequency-chirp distribution, or (iii) using inner products of the portion of the signal with chirplets where the chirp rate of the chirplet increases with frequency.

At step 1230, a score is computed for each of the frequency representations and each score corresponds to a fractional chirp rate. The score may indicate a match between the fractional chirp rate corresponding to the score and the fractional chirp rate of the portion of the signal. The scores may be computed using any of the techniques described above. In some implementations, the scores may be computed using an auto-correlation of the frequency representations, such as an auto-correlation of the magnitude squared of a frequency representation. The score may be computed from the auto-correlation using any of Fisher information, entropy, Kullback-Leibler divergence, sum of squared (or magnitude squared) values of the auto-correlation, or a sum of squared second derivatives of the auto-correlation.

At step 1240, a fractional chirp rate of the portion of the signal is estimated. In some implementations, the fractional chirp rate is estimated by selecting a fractional chirp rate corresponding to a highest score. In some implementations, the estimate of the fractional chirp rate may be refined using iterative techniques, such as golden section search or gradient descent. The estimated fractional chirp rate may then be used for further processing of the signal as described above, such as speech recognition or speaker recognition.

Figure 13:
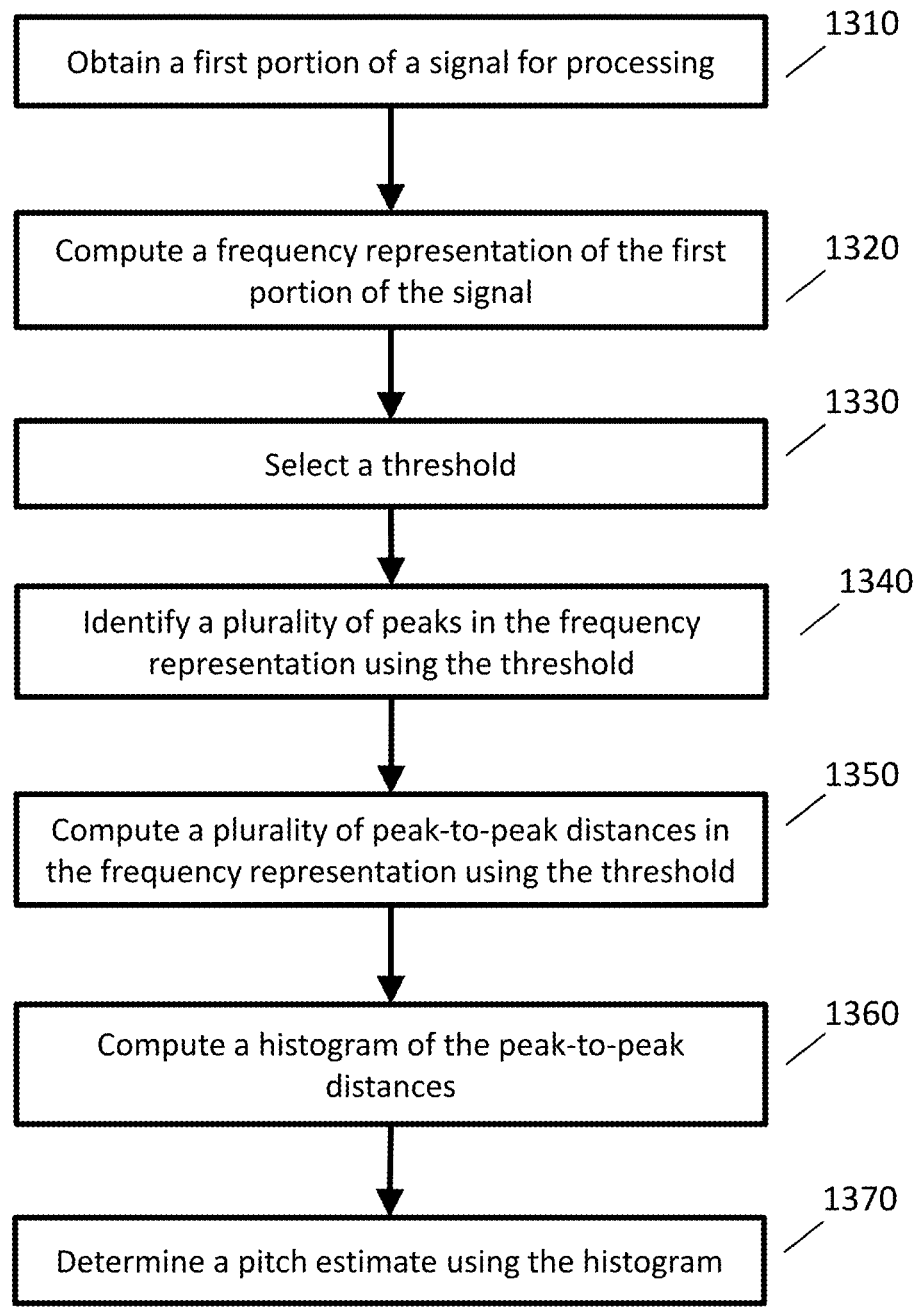
FIG. 13 is a flowchart showing an example implementation of estimating a pitch of a signal using peak-to-peak distances.

FIG. 13 is a flowchart showing an example implementation of computing a pitch estimate of a portion of a signal. At step 1310, a first portion of a signal is obtained, as described above, and at step 1320, a frequency representation of the first portion of the signal is computed, using any of the techniques described above.

At step 1330, a threshold is selected using any of the techniques described above. For example, a threshold may be selected using a signal to noise ratio or may be selected using a height of a peak in the frequency representation of the first portion of the signal.

At step 1340, a plurality of peaks in the frequency representation of the first portion of the signal are identified.

The peaks may be identified using any appropriate techniques. For example, the values of the frequency representation may be compared to the threshold to identify a continuous portion of the frequency representation (each a frequency portion) that is always above the threshold. The peak may be identified, for example, by selecting a highest point of the frequency portion, selecting the mid-point between the beginning of the portion and the end of the frequency portion, or fitting a curve (such as a Gaussian) to the frequency portion and selecting the peak using the fit. The frequency representation may accordingly be processed to identify frequency portions that are above the threshold and identify a peak for each frequency portion.

At step 1350, a plurality of peak-to-peak distances in the frequency representation of the first portion of the signal are computed. Each of the peaks may be associated with a frequency value that corresponds to the peak. The peak-to-peak distances may be computed as the difference in frequency values of adjacent peaks. For example, if peaks are present at 230 Hz, 690 Hz, 920 Hz, 1840 Hz (e.g., similar to 931, 932, 933, and 934 of FIG. 9B), then the peak-to-peak distances may be 460 Hz, 230 Hz, and 920 Hz.

Steps 1330, 1340, and 1350 may be repeated for other thresholds, changes to other settings with the same threshold, or changes to other settings with other thresholds. For example, as described above multiple thresholds may be selected using the heights of multiple peaks in the frequency representation, the same threshold or other thresholds may be used with a second frequency representation corresponding to a second portion of the signal (e.g., where the second portion is immediately before or immediately after the first portion), and the same or other thresholds may be used with different smoothing kernels.

At step 1360 a histogram of peak-to-peak distances is computed. The histogram may use some or all of the peak-to-peak distances described above. Any appropriate bin width may be used, such as a bin width of 2-5 Hz.

At step 1370, a pitch estimate is determined using the histogram of peak-to-peak distances. In some implementations, the pitch estimate may correspond to the mode of the histogram. In some implementations, multiple histograms may be used to determine the pitch estimate. For example, a plurality of histograms may be computed for a plurality of thresholds (or a plurality of thresholds in combination with other parameters, such as time instances or smoothing kernels), and a preliminary pitch estimate may be determined for each of the plurality of histograms. The final pitch estimate may be determined from the plurality of preliminary pitch estimates, for example, by selecting the most common preliminary pitch estimate.

Figure 14:
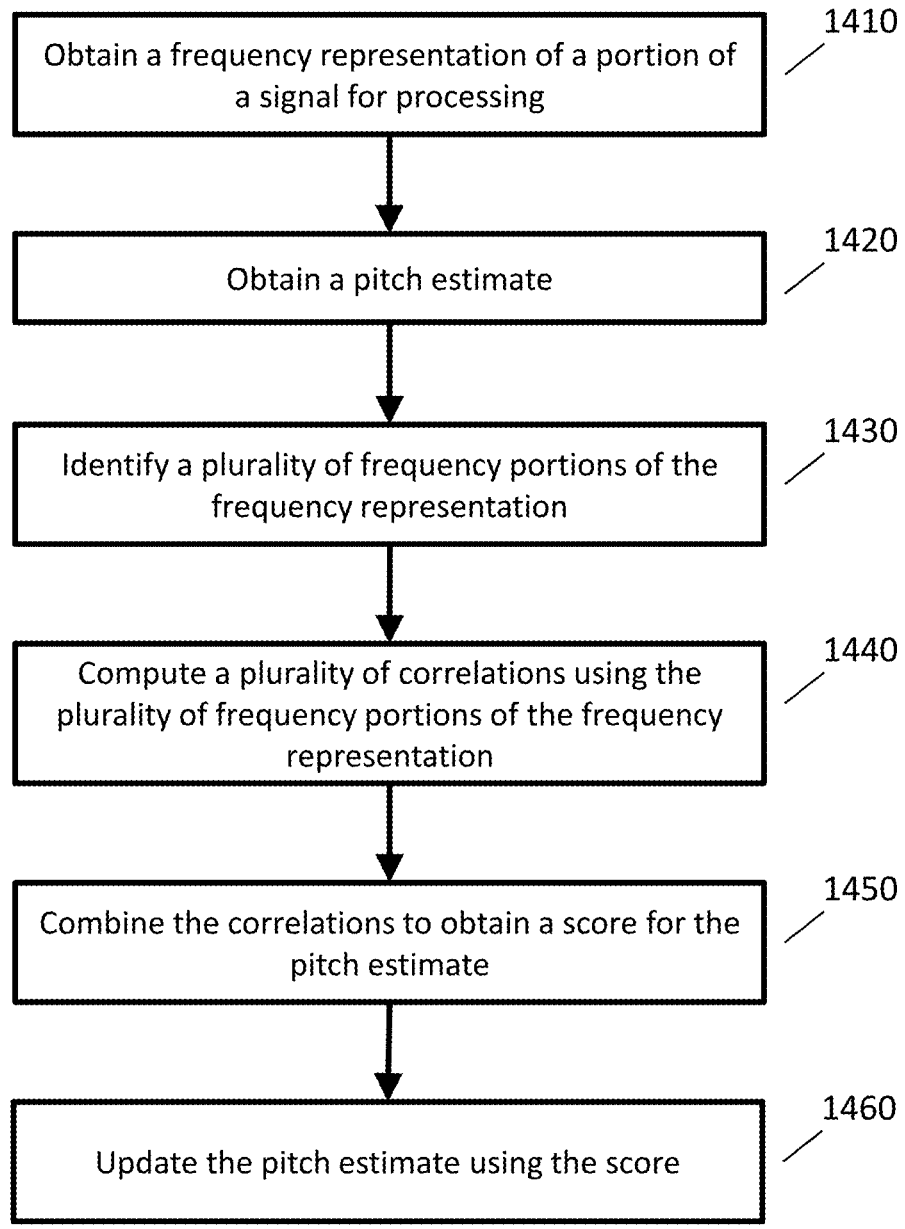
FIG. 14 is a flowchart showing an example implementation of estimating a pitch of a signal using correlations.

FIG. 14 is a flowchart showing an example implementation of computing a pitch estimate of a portion of a signal. At step 1410, a frequency representation of a portion of a signal is obtained, as described above.

At step 1420, a pitch estimate of the portion of the signal is obtained. The obtained pitch estimate may have been computed using any technique for estimating pitch, including but not limited to the coarse pitch estimation techniques described above. The obtained pitch estimate may be considered an initial pitch estimate to be updated or may be considered a running pitch estimate that is updated through an iterative procedure.

At step 1430, a plurality of frequency portions of the frequency representation is obtained. Each of the frequency portions may be centered at a multiple of the pitch estimate. For example, a first frequency portion may be centered at the pitch estimate, a second frequency portion may be centered at twice the pitch estimate, and so forth. Any appropriate widths may be used for the frequency portions. For example, the frequency portions may partition the frequency representation, may overlap, or have spaces between them.

At step 1440, a plurality of correlations is computed using the plurality of frequency portions of the frequency representation. The frequency portions may be further processed before computing the correlations. For example, each frequency portion may be extracted from the frequency representation and stored in a vector of length N, where the beginning of the vector corresponds to the beginning of the frequency portion and the end of the vector corresponds to the end of the frequency portion. The frequency portions may be shifted by sub-sample amounts so that the frequency portions line up accurately. For example, the pitch estimate may lie between frequency bins of the frequency representation (e.g., a pitch estimate of 230 Hz may lie between frequency bin 37 and frequency bin 38 with and approximate location of 37.3). Accordingly, the beginning, center, and end of the frequency portions may be defined by fractional sample values. The frequency portions may be shifted by subsample amounts so that one or more of the beginning, center, and end of the frequency portions corresponds to an integer sample of the frequency representation. In some implementations, the frequency portions may also be normalized by subtracting a mean and dividing by a standard deviation of the frequency portion.

The correlations may include any of a correlation between a first frequency portion and a second frequency portion, a correlation between a first frequency portion and a reversed second frequency portion, and a correlation between a first frequency portion and a reversed first frequency portion. The correlations may be computed using any appropriate techniques. For example, the frequency portions may be extracted from the frequency representation and stored in a vector, as described above, and the correlations may be computed by performing inner products of the vectors (or an inner product of a vector with a reversed version of another vector).

At step 1450, the correlations are combined to obtain a score for the pitch estimate. Any appropriate techniques may be used to generate a score, including for example, computing a product of the correlations, a sum of the correlations, a combination of the Fisher transformation of the correlations, or a combination likelihoods or log-likelihoods of the correlations or Fisher transformation of the correlations, as described above.

At step 1460, the pitch estimate is updated. For example, a first score for a first pitch estimate may be compared to a second score for a second pitch estimate, and the pitch estimate may be determined by selecting the pitch estimate with a highest score. Steps 1420 to 1460 may be repeated to continuously update a pitch estimate using techniques such golden section search or gradient descent. Steps 1420 to 1460 may be repeated until some appropriate stop condition has been reached such as a maximum number of iterations or the improvement in the pitch estimate from a previous estimate falling below a threshold.

Figure 15:
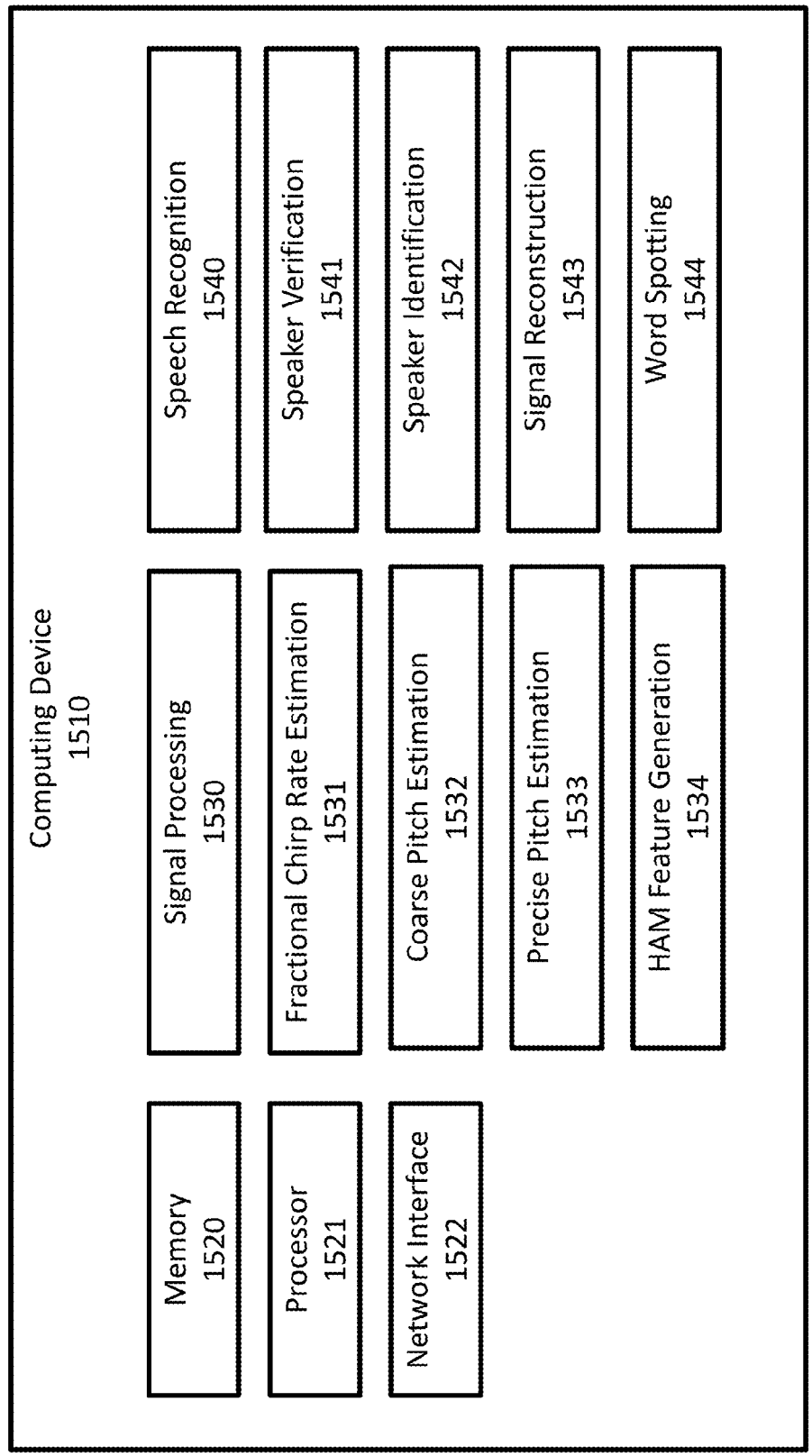
FIG. 15 is an exemplary computing device that may be used to estimate features of signals.

FIG. 15 illustrates components of one implementation of a computing device 110 for implementing any of the techniques described above. In FIG. 15, the components are shown as being on a single computing device 1510, but the components may be distributed among multiple computing devices, such as a system of computing devices, including, for example, an end-user computing device (e.g., a smart phone or a tablet) and/or a server computing device (e.g., cloud computing). For example, the collection of audio data and pre-processing of the audio data may be performed by an end-user computing device and other operations may be performed by a server.

Computing device 1510 may include any components typical of a computing device, such as volatile or nonvolatile memory 1520, one or more processors 1521, and one or more network interfaces 1522. Computing device 1510 may also include any input and output components, such as displays, keyboards, and touch screens. Computing device 1510 may also include a variety of components or modules providing specific functionality, and these components or modules may be implemented in software, hardware, or a combination thereof. Below, several examples of components are described for one example implementation, and other implementations may include additional components or exclude some of the components described below.

Computing device 1510 may have a signal processing component 1530 for performing any needed operations on an input signal, such as analog-to-digital conversion, encoding, decoding, subsampling, windowing, or computing frequency representations. Computing device 1510 may have a fractional chirp rate estimation component 1531 that estimates fractional chirp rate of a signal using any of the techniques described above. Computing device 1510 may have a coarse pitch estimation component 1532 that estimates the pitch of a signal using peak-to-peak distances as described above. Computing device 1510 may have a precise pitch estimation component 1533 that estimates the pitch of a signal using correlations as described above. Computing device 1510 may have a HAM feature generation component 1534 that determines amplitudes of harmonics as described above.

Computing device 1510 may also have components for applying the above techniques to particular applications. For example, computing device 1510 may have any of a speech recognition component 1540, a speaker verification component 1541, a speaker recognition component 1542, a signal reconstruction component 1543, and a word spotting component 1544. For example, any of an estimated fractional chirp rate, an estimated pitch, and estimated harmonic amplitudes may be used as input to any of the applications and used in addition to or in place of other features or parameters used for these applications.

Depending on the implementation, steps of any of the techniques described above may be performed in a different sequence, may be combined, may be split into multiple steps, or may not be performed at all. The steps may be performed by a general purpose computer, may be performed by a computer specialized for a particular application, may be performed by a single computer or processor, may be performed by multiple computers or processors, may be performed sequentially, or may be performed simultaneously.

The techniques described above may be implemented in hardware, in software, or a combination of hardware and software. The choice of implementing any portion of the above techniques in hardware or software may depend on the requirements of a particular implementation. A software module or program code may reside in volatile memory, non-volatile memory, RAM, flash memory, ROM, EPROM, or any other form of a non-transitory computer-readable storage medium.

Conditional language used herein, such as, "can," "could," "might," "may," "e.g.," is intended to convey that certain implementations include, while other implementations do not include, certain features, elements and/or steps. Thus, such conditional language indicates that that features, elements and/or steps are not required for some implementations. The terms "comprising," "including," "having," and the like are synonymous, used in an open-ended fashion, and do not exclude additional elements, features, acts, operations. The term "or" is used in its inclusive sense (and not in its exclusive sense) so that when used, for example, to connect a list of elements, the term or means one, some, or all of the elements in the list.

Conjunctive language such as the phrase "at least one of X, Y and Z," unless specifically stated otherwise, is to be understood to convey that an item, term, etc. may be either X, Y or Z, or a combination thereof. Thus, such conjunctive language is not intended to imply that certain embodiments require at least one of X, at least one of Y and at least one of Z to each be present.

While the above detailed description has shown, described and pointed out novel features as applied to various implementations, it can be understood that various omissions, substitutions and changes in the form and details of the devices or techniques illustrated may be made without departing from the spirit of the disclosure. The scope of inventions disclosed herein is indicated by the appended claims rather than by the foregoing description. All changes which come within the meaning and range of equivalency of the claims are to be embraced within their scope.

What is claimed is:

1. A computer-implemented method for automatic speaker recognition, the method comprising:
    obtaining a first portion of a speech signal;
    computing a first frequency representation from the first portion of the speech signal using a first fractional chirp rate;
    computing a first score using an auto-correlation of the first frequency representation;
    computing a second frequency representation from the first portion of the speech signal using a second fractional chirp rate;
    computing a second score using an auto-correlation of the second frequency representation;
    comparing the first score and the second score;
    determining a first estimated fractional chirp rate of the first portion of the speech signal corresponding to a highest score of the first score and the second score;
    determining a first estimated pitch of the first portion of the speech signal using the first estimated fractional chirp rate;
    obtaining a second portion of the speech signal, the second portion of the speech signal being at least partially non-overlapping with the first portion of the speech signal;
    computing a third frequency representation from the second portion of the speech signal using a third fractional chirp rate;
    computing a third score using an auto-correlation of the third frequency representation;
    computing a fourth frequency representation from the second portion of the speech signal using a fourth fractional chirp rate;
    computing a fourth score using an auto-correlation of the fourth frequency representation;
    comparing the third score and the fourth score;
    determining a second estimated fractional chirp rate of the second portion of the speech signal corresponding to a highest score of the third score and the fourth score;
    determining a second estimated pitch of the second portion of the speech signal using the second estimated fractional chirp rate;

computing a sequence of pitch estimates, the sequence of pitch estimates comprising the first estimated pitch and the second estimated pitch; and
applying the sequence of pitch estimates to recognize a speaker as a source of the speech signal.

2. The method of claim 1, wherein the first frequency representation is computed using a frequency chirp distribution, a pitch-velocity transform, or an inner product of the portion of the signal with a chirplet.

3. The method of claim 1, wherein the method further comprises computing a log-likelihood ratio for a plurality of frequencies of the first frequency representation, and wherein the log-likelihood ratio is a ratio of a log-likelihood that a harmonic is present at a frequency and a log-likelihood that a harmonic is not present at the frequency.

4. The method of claim 1, wherein the first score is computed using the Fisher information of the auto-correlation of the first frequency representation.

5. The method of claim 1, wherein computing the first estimated fractional chirp rate comprises selecting a fractional chirp rate corresponding to a highest score.

6. The method of claim 1, wherein the third fractional chirp rate is substantially equal to the first fractional chirp rate.

7. The method of claim 1, wherein the fourth fractional chirp rate is substantially equal to the second fractional chirp rate.

8. A system for automatic speech recognition, the system comprising one or more computing devices comprising at least one processor and at least one memory, the one or more computing devices configured to:
obtain a first portion of a speech signal;
compute a first frequency representation from the first portion of the speech signal using a first fractional chirp rate;
compute a first score using an auto-correlation of the first frequency representation;
compute a second frequency representation from the first portion of the speech signal using a second fractional chirp rate;
compute a second score using an autocorrelation of the second frequency representation;
compare the first score and the second score;
determine a first estimated fractional chirp rate of the first portion of the speech signal corresponding to a highest score of the first score and the second score;
determine a first estimated pitch of the first portion of the speech signal using the first estimated fractional chirp rate;
obtain a second portion of the speech signal, the second portion of the speech signal being at least partially non-overlapping with the first portion of the speech signal;
compute a third frequency representation from the second portion of the speech signal using a third fractional chirp rate;
compute a third score using an auto-correlation of the third frequency representation;
compute a fourth frequency representation from the second portion of the speech signal using a fourth fractional chirp rate;
compute a fourth score using an auto-correlation of the fourth frequency representation;
compare the third score and the fourth score;
determine a second estimated fractional chirp rate of the second portion of the speech signal corresponding to a highest score of the third score and the fourth score;
determine a second estimated pitch of the second portion of the speech signal using the second estimated fractional chirp rate;
compute a sequence of pitch estimates, the sequence of pitch estimates comprising the first estimated pitch and the second estimated pitch;
apply the sequence of pitch estimates to perform automatic speech recognition on the speech signal.

9. The system of claim 8, wherein the one or more computing devices are further configured to compute a log-likelihood ratio for a plurality of frequencies of the first frequency representation, and wherein the log-likelihood ratio is a ratio of a log-likelihood that a harmonic is present at a frequency and a log-likelihood that a harmonic is not present at the frequency.

10. The system of claim 8, wherein the first score is computed using the Fisher information of the auto-correlation of the first frequency representation.

11. The system of claim 8, wherein the first score indicates a match between the first fractional chirp rate and a fractional chirp rate of the first portion of the speech signal.

12. One or more non-transitory computer-readable media comprising computer executable instructions that, when executed, cause at least one processor to perform actions comprising:
obtaining a first portion of a speech signal;
computing a first frequency representation from the first portion of the speech signal using a first fractional chirp rate;
computing a first score using an auto-correlation of the first frequency representation;
computing a second frequency representation from the first portion of the speech signal using a second fractional chirp rate;
computing a second score using an auto-correlation of the second frequency representation;
comparing the first score and the second score;
determining a first estimated fractional chirp rate of the first portion of the speech signal corresponding to a highest score of the first score and the second score;
determining a first estimated pitch of the first portion of the speech signal using the first estimated fractional chirp rate;
obtaining a second portion of the speech signal, the second portion of the speech signal being at least partially non-overlapping with the first portion of the speech signal;
computing a third frequency representation from the second portion of the speech signal using a third fractional chirp rate;
computing a third score using an auto-correlation of the third frequency representation;
computing a fourth frequency representation from the second portion of the speech signal using a fourth fractional chirp rate;
computing a fourth score using an auto-correlation of the fourth frequency representation;
comparing the third score and the fourth score;
determining a second estimated fractional chirp rate of the second portion of the speech signal corresponding to a highest score of the third score and the fourth score;
determining a second estimated pitch of the second portion of the speech signal using the second estimated fractional chirp rate;
computing a sequence of pitch estimates, the sequence of pitch estimates comprising the first estimated pitch and the second estimated pitch; and applying the sequence of pitch estimates to recognize a speaker to perform signal reconstruction on the speech signal.

13. The one or more non-transitory computer-readable media of claim 12, wherein:
the first frequency representation is created by modifying a fifth frequency representation using the first fractional chirp rate; and
the second frequency representation is created by modifying the fifth frequency representation using the second fractional chirp rate.

14. The one or more non-transitory computer-readable media of claim 13, wherein the fifth frequency representation corresponds to a Fourier transform of the first portion of the signal.

* * * * *